(12) United States Patent
Murata et al.

(10) Patent No.: US 8,900,740 B2
(45) Date of Patent: Dec. 2, 2014

(54) MULTILAYER POROUS FILM

(75) Inventors: Hiroshi Murata, Tokyo (JP); Hidenori Iwasawa, Tokyo (JP); Daisuke Inagaki, Tokyo (JP); Masaki Ishikawa, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 320 days.

(21) Appl. No.: 13/321,353

(22) PCT Filed: May 21, 2010

(86) PCT No.: PCT/JP2010/058592
§ 371 (c)(1),
(2), (4) Date: Dec. 21, 2011

(87) PCT Pub. No.: WO2010/134585
PCT Pub. Date: Nov. 25, 2010

(65) Prior Publication Data
US 2012/0141859 A1     Jun. 7, 2012

(30) Foreign Application Priority Data

May 21, 2009  (JP) ................................. 2009-123625
May 21, 2009  (JP) ................................. 2009-123626
May 22, 2009  (JP) ................................. 2009-124117
May 22, 2009  (JP) ................................. 2009-124118

(51) Int. Cl.
*H01M 2/16*      (2006.01)
*B32B 27/32*     (2006.01)
*H01M 10/42*     (2006.01)

(52) U.S. Cl.
CPC ............. *B32B 27/32* (2013.01); *H01M 2/1686* (2013.01); *Y02E 60/12* (2013.01); *H01M 10/4235* (2013.01); *H01M 2/166* (2013.01)
USPC .......................................... 429/144; 429/252

(58) Field of Classification Search
None
See application file for complete search history.

(56) References Cited

U.S. PATENT DOCUMENTS

| | | |
|---|---|---|
| 6,511,774 B1 | 1/2003 | Tsukuda et al. |
| 2001/0005560 A1 | 6/2001 | Yoshida et al. |
| 2002/0034689 A1 | 3/2002 | Hoshida et al. |
| 2009/0181295 A1 | 7/2009 | Usami et al. |
| 2009/0234057 A1 | 9/2009 | Adler et al. |
| 2010/0203396 A1 | 8/2010 | Murata |
| 2010/0285348 A1 | 11/2010 | Murata et al. |
| 2011/0171523 A1* | 7/2011 | Samii et al. .................. 429/188 |

FOREIGN PATENT DOCUMENTS

| | | |
|---|---|---|
| CN | 1216163 A | 5/1999 |
| CN | 1331496 A | 1/2002 |
| CN | 101276895 A | 10/2008 |
| CN | 101316890 A | 12/2008 |
| JP | 3756815 B | 1/2006 |
| JP | 2007-83537 | 4/2007 |
| JP | 2007-083549 | 4/2007 |
| JP | 2008-186721 | 8/2008 |
| JP | 2010-036355 | 2/2010 |
| KR | 2008-0017110 A | 2/2008 |
| WO | 2008/149986 | 12/2008 |

OTHER PUBLICATIONS

Search Report issued in corresponding European Patent Application No. 10777817.7 dated Mar. 27, 2013.
English translation of International Preliminary Report on Patentability.

* cited by examiner

*Primary Examiner* — Jonathan Crepeau
(74) *Attorney, Agent, or Firm* — Morgan, Lewis & Bockius LLP

(57) ABSTRACT

A multilayer porous film, comprising a porous layer including inorganic particles and a resin binder on at least one surface of a porous film containing a polyolefin resin as a main component, wherein the inorganic particles contain an aluminum silicate compound as a main component.

16 Claims, 5 Drawing Sheets

MULTILAYER POROUS FILM

CROSS-REFERENCE TO RELATED APPLICATIONS

The present application is a U.S. National Phase Application of International Application PCT/JP2010/058592 filed May 21, 2010, which claims the benefit of Japanese Patent Application Nos. 2009-123625, filed May 21, 2009, 2009-123626, filed May 21, 2009, 2009-124117, filed May 22, 2009, and 2009-124118, filed May 22, 2009, which are hereby incorporated by reference in their entirety.

TECHNICAL FIELD

The present invention relates to a multilayer porous film suitably used for separation and decontamination of various substances and for a film disposed between a positive electrode and a negative electrode in batteries. The present invention further relates to a separator for a nonaqueous electrolyte battery and a nonaqueous electrolyte battery using the separator.

BACKGROUND ART

Polyolefin porous films are widely used as a separator in batteries, capacitors, and the like because the polyolefin porous films show high electrical insulation properties and ionic permeability. Particularly in recent years, lithium ion secondary batteries of high power density and high capacity density are used as the power supply for portable devices as the functions of the portable devices are increased and the weight thereof is reduced. The polyolefin porous film is mainly used also for a separator for batteries for such portable devices.

The lithium ion secondary battery has high power density and capacity density. Since an organic solvent is used for an electrolyte solution, however, the electrolyte solution is decomposed by generation of heat accompanied by abnormal events such as a short circuit and overcharge. This may lead to ignition in the worst case. In order to prevent such events, some safety functions are incorporated into the lithium ion secondary battery, and one of them is shutdown function of the separator. The shutdown function is a function that micro pores of the separator are blocked by thermofusion or the like to suppress ion conduction in the electrolyte solution and to stop progression of an electrochemical reaction when the battery has the abnormal heat generated. Usually, it is supposed that safety is higher as the shutdown temperature is lower. The proper shutdown temperature of a separator comprising polyethylene is one of the reasons that polyethylene is used as a component for the separator. A problem of a battery having high energy, however, is that the temperature within the battery continues increasing even if progression of the electrochemical reaction is stopped by shutdown; as a result, the separator is thermally shrunk and broken, causing a short circuit (short) in two electrodes.

In order to produce a battery with high safety, Patent Literature 1 describes a technology for laminating a heat-resistant layer on a first porous layer containing a thermoplastic resin as a main component to form a separator.

CITATION LIST

Patent Literature

Patent Literature 1: Japanese Patent No. 3756815

SUMMARY OF INVENTION

Technical Problem

In recent years, however, the capacity of the battery has been increasing. Such a high capacity battery has a large calorific value at the time of abnormal heat generation, and tends to cause a high temperature environment. While it is thought that the separator described in Patent Literature 1 has more improved safety than that of the ordinary separator having no heat-resistant layer, the separator described in Patent Literature 1 is susceptible to improvement from the viewpoint of suppressing shrinkage of the separator under a high temperature environment to reduce a possibility of a short circuit (short) of the electrodes due to breakage of the separator.

Depending on inorganic particles to be used, increase in the weight of an inorganic particles-containing layer itself cannot be ignored. Particularly, the influence tends to be larger because the volume of the separator to be used is remarkably increased in large-sized batteries for vehicles.

An object of the present invention is to provide a multilayer porous film of which thermal shrinkage is suppressed even under a high temperature environment.

Other object of the present invention is to provide a lightweight multilayer porous film of which thermal shrinkage is suppressed even under a high temperature environment.

Solution to Problem

As a result of extensive examination in order to solve the problem, the present inventors have found out that inorganic particles containing an aluminum silicate compound as a main component are used in a polyolefin porous film on which an inorganic particles-containing layer is laminated, and thereby a multilayer porous film having suppressed thermal shrinkage at a high temperature can be realized.

It have also been found out that an inorganic particle layer is composed of particles containing calcined kaolin as a main component in a polyolefin porous film on which an inorganic particles-containing layer is laminated, and thereby a very lightweight multilayer porous film having suppressed thermal shrinkage rate at a high temperature can be realized.

It have further been found out that an inorganic particle layer is composed of particles containing agalmatolite clay as a main component in a polyolefin porous film on which an inorganic particles-containing layer is laminated, and thereby in spite of a very lightweight and very thin inorganic particle layer, heat resistance is remarkably improved, a thermal shrinkage rate at a high temperature is remarkably suppressed, and no short is caused at a high temperature not less than 200° C. while favorable shutdown function is provided. Thus, the present inventors have completed the invention.

Namely, the present invention is as follows.

[1]

A multilayer porous film, comprising a porous layer including inorganic particles and a resin binder on at least one surface of a porous film containing a polyolefin resin as a main component, wherein the inorganic particles contain an aluminum silicate compound as a main component.

[2]

The multilayer porous film according to the above [1], wherein the aluminum silicate compound is calcined kaolin.

[3]

The multilayer porous film according to the above [1], wherein the aluminum silicate compound is agalmatolite clay.

[4]
The multilayer porous film according to one of the above [1] to [3], wherein an average particle size of the inorganic particles is more than 0.1 μm and not more than 4.0 μm.

[5]
The multilayer porous film according to one of the above [1] to [4], wherein in the inorganic particles, a proportion of particles having a particle size of more than 0.2 μm and not more than 1.4 μm based on the entire inorganic particles is not less than 2% by volume.

[6]
The multilayer porous film according to the above [5], wherein in the inorganic particles, a proportion of particles having a particle size of more than 0.2 μm and not more than 1.0 μm based on the entire inorganic particles is not less than 1% by volume.

[7]
The multilayer porous film according to the above [5] or [6], wherein in the inorganic particles, a proportion of particles having a particle size of more than 0.5 μm and not more than 2.0 μm based on the entire inorganic particles is not less than 8% by volume.

[8]
The multilayer porous film according to one of the above [5] to [7], wherein in the inorganic particles, a proportion of particles having a particle size of more than 0.6 μm and not more than 1.4 μm based on the entire inorganic particles is not less than 1% by volume.

[9]
The multilayer porous film according to one of the above [1] to [8], wherein a proportion (% by mass) of the inorganic particles in the porous layer is not less than 90% and not more than 99%.

[10]
The multilayer porous film according to one of the above [1] to [9], wherein the resin binder is polyvinyl alcohol.

[11]
The multilayer porous film according to one of the above [1] to [10], wherein the porous film is composed of a resin composition comprising polypropylene and a polyolefin other than polypropylene.

[12]
The multilayer porous film according to the above [11], wherein a proportion of polypropylene based on total polyolefins in the resin composition is 1 to 35% by mass.

[13]
A separator for a nonaqueous electrolyte battery, comprising the multilayer porous film according to one of the above [1] to [12].

[14]
A nonaqueous electrolyte battery, comprising the separator for the nonaqueous electrolyte battery according to the above [13], a positive electrode, a negative electrode, and an electrolyte solution.

Advantageous Effects of Invention

According to the present invention, it is possible to provide a multilayer porous film of which thermal shrinkage is suppressed even under a high temperature environment, a separator for a nonaqueous electrolyte battery, and a nonaqueous electrolyte battery using the multilayer porous film.

DESCRIPTION OF EMBODIMENTS

Figure 1:
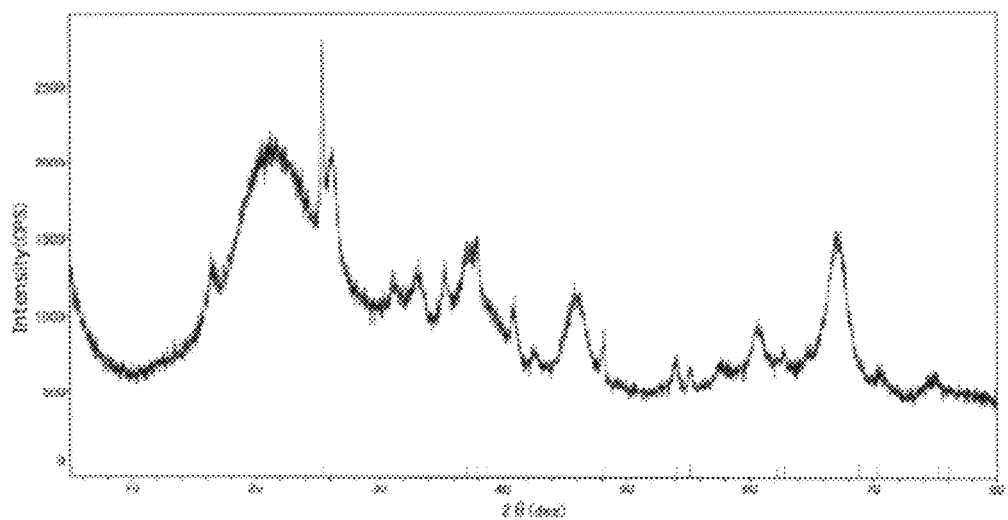
FIG. 1 shows an X-ray diffraction pattern of calcined kaolin 1 used in Example 3-1.

Hereinafter, embodiments of the present invention (hereinafter, abbreviated to "the present embodiment") will be described in detail. Here, the present invention is not limited to the following embodiments, and can be practiced within the gist thereof by making various changes and modifications.

A multilayer porous film according to a first embodiment of the present invention includes a porous layer including inorganic particles and a resin binder on at least one surface of a porous film containing a polyolefin resin as a main component, and the inorganic particles contain an aluminum silicate compound as a main component.

A multilayer porous film according to a second embodiment of the present invention includes a porous film containing a polyolefin resin as a main component, and a porous layer containing inorganic particles containing calcined kaolin as a main component and a resin binder and laminated on at least one surface of the porous film.

A multilayer porous film according to a third embodiment of the present invention includes a porous film containing a polyolefin resin as a main component, and a porous layer containing inorganic particles containing agalmatolite clay as a main component and a resin binder and laminated on at least one surface of the porous film.

The inorganic particles containing an aluminum silicate compound as a main component refer to the inorganic particles in which the aluminum silicate compound is not less than 50% and not more than 100% of the mass fraction of the entire inorganic particles. The proportion of the aluminum silicate compound is preferably not less than 70% and not more than 100%, and more preferably not less than 80% and not more than 100%.

In the inorganic particles, the proportion of the particles having a particle size of more than 0.2 μm and not more than 1.4 μm based on the entire inorganic particles is preferably not less than 2% by volume, more preferably not less than 3% by volume, still more preferably not less than 5% by volume, preferably not more than 90% by volume, and more preferably not more than 80% by volume. At such a proportion, even in the case of a thinner porous layer (for example, a thickness of not more than 7 μm), thermal shrinkage at a high temperature of the porous film tends to be suppressed, and excellent heat resistance tends to be obtained. The porous layer may be laminated on only one surface of the porous film or on both surfaces thereof.

In the inorganic particles, the proportion of particles having a particle size of more than 0.2 μm and not more than 1.0 μm based on the entire inorganic particles is preferably not less than 1% by volume, more preferably not less than 2% by volume, preferably not more than 80% by volume, and more preferably not more than 70% by volume.

In the inorganic particles, the proportion of particles having a particle size of more than 0.5 μm and not more than 2.0 μm based on the entire inorganic particles is preferably not less than 8% by volume, more preferably not less than 10% by volume, preferably not more than 60% by volume, and more preferably not more than 50% by volume.

Further, in the inorganic particles, the proportion of particles having a particle size of more than 0.6 μm and not more than 1.4 μm based on the entire inorganic particles is preferably not less than 1% by volume, more preferably not less than 3% by volume, preferably not more than 40% by volume, and more preferably not more than 30% by volume.

Such a proportion is preferred from the viewpoint of suppressing thermal shrinkage of the porous film at a high temperature and realizing more excellent heat resistance even in the case of a thinner porous layer.

Examples of a method for adjusting a proportion of a particle size mentioned above include a method for pulverizing inorganic particles to be smaller using a ball mill, a bead mill, or a jet mill.

The average particle size of the inorganic particles is preferably 0.1 μm to 15 μm, more preferably 0.1 μm to 5 μm, still more preferably more than 0.1 μm and not more than 4.0 μm, further more preferably more than 0.14 μm and not more than 3.9 μm, and particularly preferably more than 0.14 μm and not more than 3.0 μm. At an average particle size of the inorganic particles in the above range, even in the case of a thinner porous layer (for example, a thickness of not more than 7 μm), thermal shrinkage at a high temperature of the porous film tends to be suppressed, and excellent heat resistance tends to be obtained. The porous layer may be laminated on only one surface of the porous film or on both surfaces thereof.

As the inorganic particle, either synthetic products or natural products can be used with no particular limitation. Examples of natural products include kaolinite, dickite, nakhlite, halloysite, pyrophyllite, odinite, montmorillonite, beidellite, nontronite, volkonskoite, saponite, sauconite, swinefordite, vermiculite, berthierine, amesite, kellyite, fraiponite, brindleyite, biotite, phlogopite, annite, eastonite, siderophyllite tetra-ferri-annite, lepidolite, polylithionite, muscovite, celadonite, ferroceladonite, ferro-aluminoceladonite, aluminoceladonite, tobelite, paragonite, clintonite, kinoshitalite, bityite, anandite, margarite, clinochlore, chamosite, pennantite, nimite, baileychlore, donbassite, cookeite, sudoite, and the like.

Aluminosilicate minerals without ion exchange capacity such as kaolinite, dickite, nakhlite, halloysite, and pyrophyllite are preferred because of a low possibility of obstructing movement of lithium ions and in terms of electrochemical stability. Kaolin mainly composed of kaolin minerals such as kaolinite and agalmatolite mainly composed of pyrophyllite can be preferably used because these are inexpensive and easily available. Kaolin includes wet kaolin and calcined kaolin obtained by performing a calcination treatment on wet kaolin, and both of them can be preferably used. Calcined kaolin is particularly preferred in terms of electrochemical stability because water of crystallization is emitted and impurities are removed during the calcination treatment.

In the present embodiment, the particles containing calcined kaolin as a main component are employed as the inorganic particles that form the porous layer, and thereby a very lightweight porous layer can be realized while high permeability is maintained. Additionally, even in the case of a thinner porous layer, thermal shrinkage at a high temperature of the porous film tends to be suppressed, and excellent heat resistance tends to be obtained. Further, among the inorganic particles, particularly, use of calcined kaolin can realize a separator having excellent lightweightness and a suppressed air permeability increasing rate. The porous layer may be laminated on only one surface of the porous film or on both surfaces thereof.

Calcined kaolin is obtained by a calcination treatment of kaolin mainly composed of kaolin minerals such as kaolinite or agalmatolite mainly composed of pyrophyllite. Calcined kaolin is preferred to kaolin in terms of chemical stability within the battery, particularly electrochemical stability because water of crystallization is emitted and impurities are removed during the calcination treatment.

The average particle size of calcined kaolin is preferably more than 0.1 μm and not more than 4.0 μm, more preferably more than 0.2 μm and not more than 3.5 μm, and particularly preferably more than 0.4 μm and not more than 3.0 μm. Such an average particle size is preferred from the viewpoint of suppressing thermal shrinkage at a high temperature even in the case where the thickness of the porous layer is thin (for example, not more than 7 μm).

Further, in the present embodiment, the particles containing agalmatolite clay as a main component are used as the inorganic particles that compose the porous layer, and thereby a very lightweight porous layer can be attained while high permeability is maintained. Additionally, even in the case of a thinner porous layer, thermal shrinkage at a high temperature of the porous film tends to be suppressed, and excellent heat resistance tends to be obtained. The porous layer may be laminated on only one surface of the porous film or on both surfaces thereof.

In the present embodiment, the average particle size of the particles containing agalmatolite clay as a main component is preferably more than 0.1 μm and not more than 4.0 μm, more preferably more than 0.2 μm and not more than 3.5 μm, and particularly preferably more than 0.4 μm and not more than 3.0 μm. Such an average particle size is preferred from the viewpoint of suppressing thermal shrinkage at a high temperature even in the case where the thickness of the porous layer is thin (for example, not more than 7 μm).

The resin binder includes a resin binder for binding the inorganic particles onto the porous film. While the kind of resin binder is not limited, use of a resin binder insoluble to the electrolyte solution of the lithium ion secondary battery and electrochemically stable in the use range of the lithium ion secondary battery is preferred in the case where the multilayer porous film according to the present embodiment is used as a separator for lithium ion secondary batteries.

Specific examples of such a resin binder include polyolefins such as polyethylene and polypropylene; fluorine containing resins such as polyvinylidene fluoride and polytetrafluoroethylene; fluorine containing rubbers such as vinylidene fluoride-hexafluoropropylene-tetrafluoroethylene copolymers and ethylene-tetrafluoroethylene copolymers; rubbers such as styrene-butadiene copolymers and hydrides thereof, acrylonitrile-butadiene copolymers and hydrides thereof, acrylonitrile-butadiene-styrene copolymers and hydrides thereof, methacrylic acid ester-acrylic acid ester copolymers, styrene-acrylic acid ester copolymers, acrylonitrile-acrylic acid ester copolymers, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having a melting point and/or a glass transition temperature of not less than 180° C. such as polyphenylene ether, polysulfone, polyethersulfone, polyphenylene sulfide, polyetherimide, polyamidoimide, polyamide, and polyester.

In the case where polyvinyl alcohol is used as the resin binder, the degree of saponification is preferably not less than 85% and not more than 100%. A degree of saponification of not less than 85% is preferred because an improved short-circuit temperature (short temperature) and high safe performance are obtained when the multilayer porous film is used as a separator for batteries. The degree of saponification is more preferably not less than 90% and not more than 100%, still more preferably not less than 95% and not more than 100%, and particularly more preferably not less than 99% and not more than 100%.

A degree of polymerization of polyvinyl alcohol is preferably not less than 200 and not more than 5000, more preferably not less than 300 and not more than 4000, and particularly preferably not less than 500 and not more than 3500. The degree of polymerization of not less than 200 is preferred because particles containing an aluminum silicate compound as a main component can be firmly bound with a small amount of polyvinyl alcohol and increase in air permeability of the multilayer porous film caused by formation of the porous layer formation tends to be suppressed while mechanical strength of the porous layer is maintained. The degree of polymerization of not more than 5000 is preferred because gelling at the time of preparing a coating liquid or the like tends to be prevented.

From the viewpoint of binding properties of the inorganic particles and permeability and heat resistance of the multilayer porous film, the proportion (% by mass) of the inorganic particles in the porous layer is preferably not less than 50% and less than 100%, more preferably not less than 70% and not more than 99.99%, still more preferably not less than 90% and not more than 99.9%, and particularly more preferably not less than 95% and not more than 99%.

The thickness of the porous layer is preferably not less than 1 μm from the viewpoint of heat resistance of the multilayer porous film, and preferably not more than 50 μm from the viewpoint of higher capacity of the battery and permeability. The thickness of the porous layer is more preferably not less than 1.5 μm and not more than 10 μm, more preferably not less than 2 μm and not more than 7 μm, and particularly more preferably not less than 3 μm and not more than 7 μm.

In spite of lower density of the porous layer, the porous layer using calcined kaolin as the inorganic particles provides higher heat resistance than the porous layer composed of inorganic particles having substantially the same specific gravity as that of calcined kaolin. For this reason, a very lightweight and highly permeable multilayer porous film can be attained. The layer density of the formed porous layer is preferably 0.6 to 1.2 cm$^3$, more preferably 0.6 to 1.1 cm$^3$, and particularly preferably 0.7 to 1.1 cm$^3$.

In spite of lower density of the porous layer, the porous layer using agalmatolite clay as the inorganic particles provides higher heat resistance than that of the porous layer composed of inorganic particles having substantially the same specific gravity as that of agalmatolite clay. For this reason, a very lightweight and highly permeable multilayer porous film can be attained. The layer density of the formed porous layer is preferably 0.5 to 1.1 cm$^3$, more preferably 0.6 to 1.0 cm$^3$, and particularly preferably 0.7 to 0.95 cm$^3$.

Examples of a process for forming a porous layer can include a process for applying a coating liquid containing inorganic particles and a resin binder on at least one surface of a porous film containing a polyolefin resin as a main component to form a porous layer.

As a solvent for the coating liquid, those that can disperse or dissolve the inorganic particles and the resin binder uniformly and stably are preferred. Examples thereof include N-methylpyrrolidone, N,N-dimethylformamide, N,N-dimethylacetamide, water, ethanol, toluene, hot xylene, methylene chloride, hexane and the like.

In order to stabilize distribution and to improve applicability, various additives such as a dispersing agent such as a surface active agent; a thickener; a wetting agent; an antifoaming agent; a pH adjusting agent containing an acid or an alkali may be added to the coating liquid. Among these additives, the additives that can be removed at the time of removing the solvent are preferred. The porous layer, however, may have any remaining additive that is electrochemically stable in the use range of the lithium ion secondary battery, does not obstruct a cell reaction, and is stable to approximately 200° C.

A method for dissolving or dispersing the inorganic particles and the resin binder in a solvent for a coating liquid is not particularly limited as long as the method can realize dissolution or dispersion properties of the coating liquid necessary for an application step. Examples thereof include mechanical stirring by a ball mill, a bead mill, a planet ball mill, a vibration ball mill, a sand mill, a colloid mill, an attritor, a roll mill, high-speed impeller distribution, a disperser, a homogenizer, a high-speed impact mill, ultrasonic dispersion, and an impeller.

A method for applying a coating liquid to a porous film is not particularly limited as long as it can realize a necessary layer thickness and area to be applied. Examples thereof include a gravure coater method, a small diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, screen printing, spray coating and the like.

Further, performing a surface treatment on the surface of the porous film prior to application is preferred because the coating liquid is easily applied and adhesiveness between the porous layer and the surface of the porous film is improved. A process for the surface treatment is not particularly limited as long as it does not impair the porous structure of the porous film remarkably. Examples thereof include corona discharge treatment, mechanical surface roughening, a solvent treatment, an acid treatment, ultraviolet rays oxidation and the like.

A process for removing a solvent from a coated film after application is not particularly limited as long as it does not have an adverse influence on the porous film. Examples thereof include a process for drying a porous film at a temperature not more than the melting point thereof while fixing a porous film, a process for performing reduced pressure drying at a low temperature, a process for extracting a solvent simultaneously with immersion in a poor solvent to a resin binder to solidify the resin binder and the like.

Next, the porous film containing a polyolefin resin as a main component will be described.

From the viewpoint of shutdown performance and the like in the case where the porous film is used as a separator for batteries, the porous film containing a polyolefin resin as a main component is preferably a porous film composed of a polyolefin resin composition in which the polyolefin resin is not less than 50% and not more than 100% of the mass fraction of the resin components that form the porous film. The proportion of the polyolefin resin is more preferably not less than 60% and not more than 100%, and still more preferably not less than 70% and not more than 100%.

The polyolefin resin refers to polyolefin resins used for ordinary extrusion, injection, inflation, blow molding, and the like. Homopolymers, copolymers, and multistage polymers of ethylene, propylene, 1-butene, 4-methyl-1-pentene, 1-hexene, and 1-octene can be used. Moreover, polyolefins selected from the group consisting of these homopolymers, copolymers, multistage polymers and the like can be used alone, or mixed and used.

Representative examples of the polymers include low density polyethylenes, linear low density polyethylenes, medium density polyethylenes, high density polyethylenes, ultrahigh molecular weight polyethylenes, isotactic polypropylenes, atactic polypropylenes, ethylene-propylene random copolymers, polybutenes, ethylene propylene rubbers, and the like.

In the case where the multilayer porous film is used as a battery separator, use of the resins containing particularly high density polyethylene as a main component is preferred for its low melting point and high strength.

Moreover, from the viewpoint of improvement in heat resistance of the porous film and in that of the multilayer porous film, use of a porous film composed of a resin composition containing polypropylene and a polyolefin resin other than polypropylene is more preferred.

Here, the conformation of polypropylene is not limited, and any of isotactic polypropylenes, syndiotactic polypropylenes, and atactic polypropylenes may be used.

From the viewpoint of compatibility between heat resistance and favorable shutdown function, the proportion of polypropylene based on the total polyolefins in the polyolefin resin composition is preferably 1 to 35% by mass, more preferably 3 to 20% by mass, and still more preferably 4 to 10% by mass.

In this case, the polyolefin resin other than polypropylene is not limited, and examples thereof include homopolymers or copolymers of olefin hydrocarbons such as ethylene, 1-butene, 4-methyl-1-pentene, 1-hexene, and 1-octene. Specifically, examples thereof include polyethylenes, polybutenes, ethylene-propylene random copolymers, and the like.

In the case where shutdown by blocking pores by thermofusion is required, for example, in the case where the multilayer porous film is used as a separator for batteries, use of polyethylenes such as low density polyethylenes, linear low density polyethylenes, medium density polyethylenes, high density polyethylenes, and ultrahigh molecular weight polyethylenes is preferred as the polyolefin resin other than polypropylene. Among these, use of polyethylenes having a density of not less than 0.93 g/cm$^3$, which is measured according to JIS K 7112, is more preferred from the viewpoint of strength.

The viscosity average molecular weight of the polyolefin resin is preferably not less than 30,000 and not more than 12 million, more preferably not less than 50,000 and less than 2 million, and still more preferably not less than 100,000 less than 1 million. The viscosity average molecular weight of not less than 30,000 is preferred because melt tension at the time of melt molding tends to be larger to provide high moldability, and entanglement of the polymers tends to provide higher strength. On the other hand, the viscosity average molecular weight of not more than 12 million is preferred because uniform melt kneading tends to be facilitated to provide higher moldability into the sheet, particularly higher thickness stability of the sheet. Further, in the case where the multilayer porous film according to the present embodiment is used as a separator for batteries, the viscosity average molecular weight of less than 1 million is preferred because pores are easily blocked when the temperature is raised and favorable shutdown function tends to be obtained. Instead of using a polyolefin with a viscosity average molecular weight of less than 1 million alone, for example, a mixture of a polyolefin having a viscosity average molecular weight of 2 million and a polyolefin having a viscosity average molecular weight of 270,000 may be used, or a mixture having a viscosity average molecular weight of less than 1 million may be used.

The polyolefin resin composition can contain any additives. Examples of such additives include polymers other than polyolefins; inorganic particles; antioxidants such as phenol antioxidants, phosphorus antioxidants, and sulfur antioxidants; metallic soaps such as calcium stearate and zinc stearate; an ultraviolet absorbing agent; a light stabilizer; an antistatic agent; an anti-fogging agent; color pigments, and the like.

The total amount of these additives to be added is preferably not more than 20 parts by mass, more preferably not more than 10 parts by mass, and still more preferably not more than 5 parts by mass based on 100 parts by mass of the polyolefin resin composition.

The average pore size of the porous film is not limited, but can be properly determined according to application. In the case where the multilayer porous film is used as a separator for batteries, the average pore size is preferably 0.001 μm to 10 μm, and more preferably 0.01 μm to 1 μm.

The process for producing the porous film is not limited, but any known production process can be applied. Examples thereof include a process for porosifying by melting and kneading a polyolefin resin composition and a plasticizer to mold the kneaded product into a sheet form, stretching the sheet in some cases, and extracting the plasticizer; a process for porosifying by melting and kneading a polyolefin resin composition, extruding the kneaded product at a high stretch ratio to peel off a polyolefin crystal interface by heat treatment and stretching; a process for porosifying by melting and kneading a polyolefin resin composition and an inorganic filler, molding the kneaded product into a sheet form, and stretching the molded product to peel off the interface between the polyolefin and the inorganic filler; and a process for porosifying by dissolving a polyolefin resin composition, and removing a solvent simultaneously with immersion in a poor solvent to the polyolefin to solidify the polyolefin.

Hereinafter, a process for melting and kneading a polyolefin resin composition and a plasticizer, molding the kneaded product into a sheet form, and extracting the plasticizer will be described as an example of the process for producing a porous film.

First, the polyolefin resin composition and the plasticizer are molten and kneaded. Examples of the melting kneading process include a process for feeding a polyolefin resin and other additives when necessary to a resin kneading apparatus such as an extruder, a kneader, a Labo Plast mill, a mixing roll, or a Banbury mixer, and introducing and kneading a plasticizer at an arbitrary proportion while heat melting the resin component. At this time, prior to feeding to the resin kneading apparatus, the polyolefin resin, the other additives, and the plasticizer are preferably kneaded in advance at a predetermined proportion using a Henschel mixer or the like. More preferably, the plasticizer is partially fed in the advance kneading, and the rest of the plasticizer is kneaded while being side-fed in the resin kneading apparatus. Thereby, dispersibility of the plasticizer is increased, and the sheet-like molded product can be stretched at a high stretch ratio without breaking when the sheet-like molded product of the molten and kneaded product of the resin composition and the plasticizer is stretched at a subsequent step.

As the plasticizer, a nonvolatile solvent that can form a homogeneous solution at a temperature of not less than the melting point of polyolefin can be used. Specific examples of such a nonvolatile solvent include hydrocarbons such as liquid paraffin and paraffin wax; esters such as dioctyl phthalate and dibutyl phthalate; and higher alcohols such as oleyl alcohol and stearyl alcohol. Among these, preferred is liquid paraffin because it has high compatibility with polyethylene and polypropylene and causes no or little peeling at the interface between the resin and the plasticizer by stretching the molten and kneaded product, and thereby uniform stretching tends to be performed.

The proportion of the plasticizer to the polyolefin resin composition is not particularly limited, and the plasticizer can be added at any proportion in which the polyolefin resin composition and the plasticizer can be uniformly molten and kneaded to be molded into a sheet form. For example, the mass fraction of the plasticizer based on the composition composed of the polyolefin resin composition and the plasticizer is preferably 30 to 80% by mass, and more preferably 40 to 70% by mass. At a mass fraction of the plasticizer of not more than 80% by mass, insufficient melt tension at the time of melt molding tends not to be caused, leading to improved moldability. On the other hand, at a mass fraction of not less than 30% by mass, polyolefin chains are not cut by stretching the mixture of the polyolefin resin composition and the plasticizer even at a high stretch ratio, leading to a uniform and micro pore structure. Moreover, strength tends to be increased.

Next, the molten and kneaded product is molded into a sheet form. Examples of a process for producing a sheet-like molded product include a process for extruding a molten and kneaded product into a sheet form through a T die or the like, contacting the extruded product with a heat conductive body to cool the extruded product to a temperature sufficiently lower than the crystallization temperature of the resin component and solidify the extruded product. As the heat conductive body used for cooling and solidification, a metal, water, air, or the plasticizer itself can be used. A metal roll is preferred for its high efficiency of heat conduction. In this case, it is more preferred that the extruded product be sandwiched between the rolls when the extruded product is contacted with the metal rolls, because of further increased efficiency of heat conduction, increased film strength by orientation of the sheet, and improved surface smoothness of the sheet. The die lip gap at the time of extrusion from the T die into a sheet form is preferably not less than 400 μm and not more than 3000 μm, and more preferably not less than 500 μm and not more than 2500 μm. At a die lip gap of not less than 400 μm, die drool or the like tends to be reduced, a small influence on film quality such as stripes and drawbacks tends to be given, and breakage of the film at the subsequent stretching step tends to be prevented. On the other hand, at a die lip gap of not more than 3000 μm, the extruded product tends to be cooled rapidly to prevent uneven cooling, and thickness stability of the sheet tends to be maintained.

Preferably, the thus-obtained sheet-like molded product is stretched. As the stretching treatment, either uniaxial stretching or biaxial stretching can be used suitably. From the viewpoint of strength of the porous film obtained, biaxial stretching is preferred. By stretching of the sheet-like molded product in two axial directions at a high stretch ratio, molecules are oriented in the planar direction, and thereby the porous film eventually obtained is difficult to tear and obtains high piercing strength. Examples of the stretching can include processes such as simultaneous biaxial stretching and successive biaxial stretching, multi stage stretching, and stretching several times. From the viewpoint of improvement in piercing strength, uniformity of stretching, and shutdown properties, the simultaneous biaxial stretching is preferred.

Here, the simultaneous biaxial stretching refers to a stretching process that simultaneously performs stretching in the MD (machine direction of the microporous film) and stretching in the TD (the direction intersecting the MD of the microporous film at an angle of 90°). The stretch ratios in the directions may be different. The successive biaxial stretching refers to a stretching process that performs stretching in the MD or that in the TD independently. When stretching is performed in one of the MD and the TD, the microporous film is non-restrained or fixed at a fixed length in the other direction thereof.

The stretch ratio is preferably in the range of not less than 20 times and not more than 100 times, and more preferably in the range of not less than 25 times and not more than 50 times in terms of an areal stretch ratio. The stretch ratio in each axial direction is preferably in the range of not less than 4 times and not more than 10 times in the MD and not less than 4 times and not more than 10 times in the TD, and more preferably in the range of not less than 5 times and not more than 8 times in the MD and not less than 5 times and not more than 8 times in the TD. At a total areal stretch ratio of not less than 20 times, sufficient strength tends to be given to the porous film obtained. On the other hand, at a total areal stretch ratio of not more than 100 times, breakage of the film at the stretching step tends to be prevented, and high productivity tends to be obtained.

The sheet-like molded product may be rolled. Rolling can be performed by a pressing process that uses a double belt press machine, for example. Rolling can particularly increase orientation of a layer portion. The rolling areal stretch ratio is preferably more than 1 time and not more than 3 times, and more preferably more than 1 time and not more than 2 times. At a rolling ratio greater than 1 time, plane orientation tends to be increased to increase film strength of the porous film finally obtained. On the other hand, a rolling ratio of not more than 3 times is preferred because a porous structure having a small orientation difference between the layer portion and an inner central portion and uniformity in the thickness direction of the film tends to be formed.

Next, the plasticizer is removed from the sheet-like molded product to obtain a porous film. Examples of the process for removing a plasticizer include a process for immersing a sheet-like molded product in an extraction solvent to extract a plasticizer, and sufficiently drying. The process for extracting a plasticizer may be a batch process or a continuous process. In order to suppress shrinkage of the porous film, edges of the sheet-like molded product are preferably restrained during the series of steps of immersion and drying. The amount of the remaining plasticizer in the porous film is preferably less than 1% by mass.

As the extraction solvent, those that are a poor solvent to the polyolefin resin and a good solvent to the plasticizer and have a boiling point lower than the melting point of the polyolefin resin are preferably used. Examples of such an extraction solvent include hydrocarbons such as n-hexane and cyclohexane; halogenated hydrocarbons such as methylene chloride and 1,1,1-trichloroethane; non-chlorine halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be recovered by operation such as distillation to be reused.

In order to suppress shrinkage of the porous film, a heat treatment such as heat setting and thermal relaxation can also be performed after the stretching step or formation of the porous film. Alternatively, the porous film may be subjected to post-treatments such as hydrophilization treatment by a surface active agent, a crosslinking process by ionizing radiation, or the like.

Next, a case where the multilayer porous film according to the present embodiment is used as a separator for batteries will be described.

The multilayer porous film according to the present embodiment is suitable for a separator for batteries that isolates a positive electrode from a negative electrode in the battery, because the multilayer porous film has high heat resistance and shutdown function.

Particularly, the multilayer porous film according to the present embodiment hardly causes a short circuit at a high temperature and can also be safely used as a separator for high electromotive force batteries.

Examples of such high electromotive force batteries include nonaqueous electrolyte batteries. The multilayer porous film according to the present embodiment is disposed between the positive electrode and the negative electrode, and a nonaqueous electrolyte solution is held. Thus, a nonaqueous electrolyte battery can be produced.

Any known positive electrode, negative electrode, and nonaqueous electrolyte solution can be used without limitation.

Examples of a positive electrode material include lithium containing complex oxides such as $LiCoO_2$, $LiNiO_2$, spinel $LiMnO_4$, and olivine $LiFePO_4$. Examples of a negative pole material include carbon materials such as graphite, non-graphitizable carbon, graphitizable carbon, and composite carbon bodies; silicon, tin, metal lithium, various alloy materials, and the like.

As the nonaqueous electrolyte solution, an electrolyte solution prepared by dissolving an electrolyte in an organic solvent can be used. Examples of the organic solvent include propylene carbonate, ethylene carbonate, dimethyl carbonate, diethyl carbonate, ethyl methyl carbonate, and the like. Examples of the electrolyte include lithium salts such as $LiClO_4$, $LiBF_4$, and $LiPF_6$.

In the case where the multilayer porous film is used as a separator for batteries, the air permeability of the multilayer porous film is preferably not less than 10 seconds/100 cc and not more than 650 seconds/100 cc, more preferably not less than 20 seconds/100 cc and not more than 500 seconds/100 cc, still more preferably not less than 30 seconds/100 cc and not more than 450 seconds/100 cc, and particularly preferably not less than 50 seconds/100 cc and not more than 400 seconds/100 cc. At an air permeability of not less than 10 seconds/100 cc, the self-discharge at the time of use as a separator for batteries tends to be reduced. At an air permeability of not more than 650 seconds/100 cc, high charging and discharging characteristics tend to be obtained.

The rate of increase in the air permeability of the multilayer porous film by formation of the porous layer is preferably not less than 0% and not more than 200%, more preferably not less than 0% and not more than 100%, still more preferably not less than 0% and not more than 75%, and particularly preferably not less than 0% and not more than 50%. In the case of the air permeability of the porous film less than 100 seconds/100 cc, however, a multilayer porous film having the porous layer formed and a rate of increase in the air permeability of not less than 0% and not more than 500% can be preferably used.

The final film thickness of the multilayer porous film is preferably not less than 2 µm and not more than 200 µm, more preferably not less than 5 µm and not more than 100 µm, and still more preferably not less than 7 µm and not more than 30 µm. At a film thickness of not less than 2 µm, sufficient mechanical strength tends to be obtained. At a film thickness of not more than 200 µm, the volume occupied by the separator tends to be reduced, leading to an advantage from the viewpoint of increase in the battery capacity.

The thermal shrinkage rate at 150° C. of the multilayer porous film is preferably not less than 0% and not more than 15%, more preferably not less than 0% and not more than 10%, and still more preferably not less than 0% and not more than 5% both in the MD and in the TD. A thermal shrinkage rate of not more than 15% in the MD and the TD is preferred because breakage of the multilayer porous film at the time of abnormal heat generation of the battery tends to be suppressed, hardly causing a short circuit.

The shutdown temperature of the multilayer porous film is preferably not less than 120° C. and not more than 160° C., and more preferably in the range of not less than 120° C. and not more than 150° C. A shutdown temperature of not more than 160° C. is preferred because rapid current interruption tends to be facilitated if the battery generates heat, providing higher safe performance. On the other hand, a shutdown temperature of not less than 120° C. is preferred because the battery can be used at around 100° C.

The short-circuit temperature of the multilayer porous film is preferably not less than 180° C. and not more than 1000° C., and more preferably not less than 200° C. and not more than 1000° C. At a short-circuit temperature of not less than 180° C., even if abnormal heat generation occurs in the battery, a short circuit does not immediately occur. Accordingly, the heat can be dissipated during that period, and higher safe performance is obtained.

The short-circuit temperature can be controlled at a desired value by adjusting the content of polypropylene, the kind of polyolefin other than polypropylene, the kind of inorganic particles, the thickness of the inorganic particles-containing layer, and the like.

The various parameters mentioned above are measured according to measuring methods in Examples described later, unless otherwise specified.

EXAMPLES

Hereinafter, the present embodiment will be described in more detail. Here, the present embodiment is not limited to the following Examples as long as it does not go beyond the gist thereof. The physical properties in Examples were measured by the following methods.

(1) Viscosity Average Molecular Weight (Mv) of Polyolefin

The limiting viscosity [η] (dl/g) at 135° C. in a decalin solvent was determined according to ASTM-D4020.

Polyethylene was calculated by the following expression.

$$[\eta]=6.77\times 10^{-4} Mv^{0.67}$$

The Mv of polypropylene was calculated by the following expression.

$$[\eta]=1.10\times 10^{-4} Mv^{0.80}$$

(2) Film Thickness of Porous Film, and Layer Thickness of Porous Layer

Samples of MD 10 mm×TD 10 mm were cut out from a porous film and a multilayer porous film. In each sample, nine points (three points×three points) positioned in a lattice shape were selected, and the film thicknesses thereof were measured using a dial gauge (made by Ozaki MFG. Co., Ltd., PEACOCK No. 25 (registered trademark)). The film thickness (µm) of the porous film and that of the multilayer porous film each were defined as the average value of the measured values at the nine points. The difference between the film thickness of the multilayer porous film thus measured and that of the porous film thus measured was defined as the thickness (μm) of the porous layer.

(3) Particle Size Distribution and Average Particle Size (μm) of Inorganic Particles Inorganic particles were added to distilled water, a small amount of a hexametaphosphoric acid sodium aqueous solution was added thereto, and dispersed for 1 minute by an ultrasonic homogenizer. Then, particle size distribution was measured using a laser particle size distribution analyzer (made by Nikkiso Co., Ltd., Microtrac MT3300EX). The average particle size was defined as a particle size whose cumulative frequency reached 50%.

(4) Porous Film Air Permeability (sec/100 cc), and Air Permeability Increasing (Rising) Rate (%) by Formation of Porous Layer Using a Gurley type densometer (made by Toyo Seiki Seisaku-sho, Ltd., G-B2 (trademark), the mass of the internal cylinder: 567 g) according to JIS P-8117, a time (sec) taken for 100 cc of the air to pass through the porous film having an area of 645 mm² (a circle having a diameter of 28.6 mm) and a time (sec) taken for 100 cc of the air to pass through the multilayer porous film having the same size were measured. These measured values were defined as the air permeability of the porous film and that of the multilayer porous film, respectively.

The air permeability increasing rate due to formation of the porous layer was calculated by the following expression.

Air permeability increasing rate (%)={(air permeability of multilayer porous film−air permeability of porous film)/air permeability of porous film}×100

(5) Thermal Shrinkage Rate at 150° C. (%)

A separator was cut into 100 mm in the MD and 100 mm in the TD, and left as it was at a 150° C. oven for 1 hour. At this time, the sample was sandwiched between two sheets of paper so as not to be exposed to warm air directly. The sample was extracted from the oven to be cooled. The length (mm) of the sample was measured, and the thermal shrinkage rates in the MD and in the TD were calculated by the following expression.

MD thermal shrinkage rate (%)=(100−length of MD after heating)/100×100

TD thermal shrinkage rate (%)=(100−length of TD after heating)/100×100

(6) Shutdown Temperature and Short-circuit Temperature of Multilayer Porous Film a. Production of Positive Electrode 92.2 parts by mass of lithium cobalt multiple oxide (LiCoO$_2$) as a positive electrode active substance, 2.3 parts by mass of flake graphite and 2.3 parts by mass of acetylene black as an electric conduction material, and 3.2 parts by mass of polyvinylidene fluorides (PVDF) as a resin binder were prepared. These were dispersed in N-methylpyrrolidone (NMP) to prepare a slurry. Using a die coater, this slurry was applied onto one surface of an aluminum foil having a thickness of 20 μm and serving as a positive electrode collector such that the amount of the positive electrode active substance to be applied might be 250 g/m². The slurry was dried at 130° C. for 3 minutes. Then, using a roll press machine, the product was compression-formed such that the bulk density of the positive electrode active substance might be 3.00 g/cm³. Thus, a positive electrode was obtained.

b. Production of Negative Electrode 96.6 parts by mass of artificial graphite as a negative electrode active substance, and 1.4 parts by mass of an ammonium salt of carboxymethyl cellulose, and 1.7 parts by mass of a styrene-butadiene copolymer latex as a resin binder were prepared. These were dispersed in purified water to prepare a slurry. Using a die coater, this slurry was applied onto one surface of a copper foil having a thickness of 12 μm and serving as a negative electrode collector such that the amount of the negative electrode active substance to be applied might be 106 g/m². The slurry was dried at 120° C. for 3 minutes. Then, using a roll press machine, the product was compression-formed such that the bulk density of the negative electrode active substance might be 1.35 g/cm³. Thus, a negative electrode was obtained.

c. Preparation of Nonaqueous Electrolyte Solution

LiBF$_4$ as a solute was dissolved in a mixed solvent of propylene carbonate:ethylene carbonate:γ-butyllactone=1:1:2 (volume ratio) such that the concentration might be 1.0 mol/L, to prepare a nonaqueous electrolyte solution.

d. Measurement of Shutdown Temperature and Short-circuit Temperature

A negative electrode cut into 65 mm×20 mm and immersed in the nonaqueous electrolyte solution for not less than 1 minute, an aramid film of 9 μm (thickness)×50 mm×50 mm having a hole with a diameter 16 mm in the central portion thereof, a multilayer porous film or porous film cut into 65 mm×20 mm and immersed in the nonaqueous electrolyte solution for not less than 1 hour, a positive electrode cut into 65 mm×20 mm and immersed in the nonaqueous electrolyte solution for not less than 1 minute, a Kapton film, and a silicone rubber having a thickness of approximately 4 mm were prepared, and laminated in this order on a ceramic plate having a thermocouple connected thereto. This laminated body was set on a hot plate. While a pressure of 4.1 MPa was applied to the laminated body by a hydraulic press machine, the temperature was raised at the rate of 15° C./min. Change in the impedance between the positive electrode and the negative electrode was measured to 200° C. under the conditions of a 1 V and 1 kHz alternating current.

The shutdown temperature was defined as a temperature at which the impedance reached 1000Ω. The short-circuit temperature was defined as a temperature at which the impedance fell below 1000Ω again after shutdown.

(7) Evaluation of Suitability of Separator for Batteries a. Production of Positive Electrode A disk having an area of 2.00 cm² was stamped out of a positive electrode produced in the same manner as that in a of (6).

b. Production of Negative Electrode

A disk having an area of 2.05 cm² was stamped out of a negative electrode produced in the same manner as that in b of (6).

c. Nonaqueous Electrolyte Solution

LiPF$_6$ as a solute was dissolved in a mixed solvent of ethylene carbonate:ethylmethyl carbonate=1:2 (volume ratio) such that the concentration might be 1.0 ml/L, to prepare a nonaqueous electrolyte solution.

d. Assembly of Battery

The negative electrode, the multilayer porous film, and the positive electrode were laminated in this order such that the active substance surface of the positive electrode might face that of the negative electrode. This laminated body was accommodated in a stainless steel metal container with a cover insulated from the container main body such that the copper foil of the negative electrode and the aluminum foil of the positive electrode each might contact the container main body and the cover. The nonaqueous electrolyte solution was injected into this container, and the container was sealed.

e. Evaluation (Rate Characteristics)

A simple battery assembled at d. was charged to a cell voltage of 4.2 V at a current value of 3 mA (approximately 0.5C) at 25° C. Reduction of the current value was started from 3 mA such that 4.2 V was kept. In such a manner, initial charging after production of the battery was performed for approximately 6 hours in total, and then, discharging was performed to a cell voltage of 3.0 V at a current value of 3 mA.

Next, charging was performed to a cell voltage of 4.2 V at a current value of 6 mA (approximately 1.0C) at 25° C. Reduction of the current value was started from 6 mA such that 4.2 V was kept. In such a manner, charging was performed for approximately 3 hours in total, and then, discharging was performed to a cell voltage of 3.0 V at a current value of 6 mA. The discharge capacity at the time was defined as 1C discharge capacity (mAh).

Next, charging was performed to a cell voltage of 4.2 V at a current value of 6 mA (approximately 1.0C) at 25° C. Reduction of the current value was started from 6 mA such that 4.2 V was kept. In such a manner, charging was performed for approximately 3 hours in total, and then, discharging was performed to a cell voltage of 3.0 V with at current value of 12 mA (approximately 2.0C). The discharge capacity at the time was defined as 2C discharge capacity (mAh).

The proportion of 2C discharge capacity to 1C discharge capacity was calculated, and this value was defined as the rate characteristics.

Rate characteristics (%)=(2C discharge capacity/1C discharge capacity)×100

(Cycle Characteristics)

A simple battery whose rate characteristics were evaluated was charged to a cell voltage of 4.2 V at a current value of 6 mA (approximately 1.0C) at 60° C. Reduction of the current value was started from 6 mA such that 4.2 V was kept. In such a manner, charging was performed for approximately 3 hours in total, and then, discharging was performed to a cell voltage of 3.0 V at a current value of 6 mA. Such a cycle was repeated 100 times, and the discharge capacity (mAh) at the first cycle and that at the 100th cycle was measured.

The proportion of the discharge capacity at the 100th cycle to the first discharge capacity was calculated, and this value was defined as the cycle characteristics.

Cycle characteristics (%)=(100th discharge capacity/first discharge capacity)×100

(8) Porosity (%)

A sample of a 10 cm×10 cm square was cut out from the microporous film, and the volume (cm$^3$) and mass (g) thereof were determined. At a film density of 0.95 (g/cm$^3$), the porosity was calculated using the following expression.

Porosity=(1−mass/volume/0.95)×100

(9) Layer Density of Porous Layer

Samples of MD 100 mm×TD 100 mm were cut from three places of the porous film and three places of the multilayer porous film. The weight of each sample was measured using an electronic balance. The average value of the three samples of the porous film was defined as the basis weight (g/100 cm$^2$) of the porous film, and the average value of the three samples of the porous film was defined as that of the multilayer porous film. The difference between the basis weight of the multilayer porous film and that of the porous film thus measured was defined as the basis weight (g/100 cm$^2$) of the porous layer. The layer density of the porous layer was calculated by the following expression.

Layer density (g/cm$^3$) of porous layer=basis weight of porous layer (g/100 cm$^2$)/thickness of porous layer (μm)×100

(10) Reactivity of Inorganic Particles with Electrolyte Solution (Reaction-Heat Peak)

5 mg of the nonaqueous electrolyte solution, which was prepared by dissolving LiPF$_6$ as a solute in a mixed solvent of 5 mg of the inorganic particles and ethylene carbonate:ethylmethyl carbonate=1:2 (volume ratio) such that the concentration might be 1.0 ml/L, was added to an aluminum pan for measurement. The aluminum pan was covered, and sealed by a caulker. This was installed in a differential thermal analyzing and measuring apparatus (DSC210 made by SII Nano-Technology Inc.). The temperature was raised from room temperature to 200° C. at 10° C./min., and presence of a reaction-heat peak was measured.

(11) Composition Analysis of Inorganic Particles

The inorganic particles were filled in a 20 mmϕ aluminum ring, and molded into a tablet. Qualitative analysis of all the elements was performed using an X-ray fluorescence spectrometer (made by Rigaku Corporation, ZSX-100e (Rh tube)). The percentage of each element contained was calculated semi-quantitatively from the peak intensity to determine the composition.

(12) Structural Analysis of Inorganic Particles

An aluminum holder having a depth of 2 mm was filled with the inorganic particles. Using an X-ray diffraction spectrometer (made by Rigaku Corporation, Rint-2500 (Cu tube)), an X diffraction pattern was measured at a measuring range of 5° to 80° and a scan rate of 4°/min.

The particles containing an aluminum silicate compound as a main component and used in Examples 1-1 to 1-19 and Comparative Examples 1-1 to 1-4 are as follows.

Kaolins 1, 2, 3, and 5: an aluminosilicate mineral containing kaolinite ($Al_2Si_2O_5(OH)_4$) as a main component.

Kaolin 4: an aluminosilicate mineral containing pyrophyllite ($Al_2Si_4O_{10}(OH)_2$) as a main component.

Kaolins 6 and 7: prepared by wet grinding of kaolin 4 by a bead mill.

Calcined kaolin 1: prepared by calcining the kaolin containing kaolinite as a main component at a high temperature.

Calcined kaolin 2: prepared by wet grinding of calcined kaolin 1 by a bead mill.

Synthetic aluminum silicate 1: chemically synthesized aluminum silicate.

Synthetic aluminum silicates 2 and 3: prepared by wet grinding of synthetic aluminum silicate 1 by a bead mill.

Table 1 shows the particle size distribution and average particle size of each particle.

Example 1-1

47 parts by mass of a homopolymer polyethylene having an Mv of 700,000, 46 parts by mass of a homopolymer polyethylene having an Mv of 250,000, and 7 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] was added as an antioxidant to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of 7.59×10$^{-5}$ m$^2$/s at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 2000 μm.

Next, the polyolefin composition was guided to a simultaneous biaxial tenter stretching machine, and subjected to simultaneous biaxial stretching 7 times in the MD and 7 times in the TD. At this time, the preset temperature of the simultaneous biaxial tenter was 125° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 133° C., and the TD relaxation rate was 0.80. As a result, a polyolefin resin porous film having a film thickness of 16 μm, a porosity of 40%, and an air permeability of 160 seconds/100 cc was obtained.

Next, 98.2 parts by mass of kaolin 1 in Table 1 and 1.8 parts by mass of polyvinyl alcohol (hereinafter, abbreviated to "PVA" in some cases. The average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 4 μm was formed on the polyolefin resin porous film.

Example 1-2

A multilayer porous film was obtained in the same manner as that in Example 1-1 except that kaolin 2 in Table 1 was used and the thickness of the porous layer was 3 μm.

Example 1-3

A multilayer porous film was obtained in the same manner as that in Example 1-1 except that kaolin 3 in Table 1 was used.

Example 1-4

A multilayer porous film was obtained in the same manner as that in Example 1-1 except that 97.5 parts by weight of kaolin 7 in Table 1 and 2.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 5 μm was formed on the polyolefin resin porous film.

Example 1-5

A multilayer porous film was obtained in the same manner as that in Example 1-1 except that 97.0 parts by weight of calcined kaolin 1 in Table 1 and 3.0 parts by weight of polyvinyl alcohol (the average degree of polymerization of 1700 and the degree of saponification of not less than 99%) were uniformly dispersed in 150 parts by weight of water to prepare a coating liquid.

Example 1-6

A multilayer porous film was obtained in the same manner as that in Example 1-1 except that calcined kaolin 2 in Table 1 was used.

Example 1-7

A multilayer porous film was obtained in the same manner as that in Example 1-1 except that 95.0 parts by mass of calcined kaolin 2 in Table 1, 5.0 parts by mass of an acrylic latex (AclLTX, the solid concentration of 40%, the average particle size of 90 nm, the lowest film-forming temperature of not more than 0° C.), 1 part by weight of a polycarboxylic acid ammonium aqueous solution (made by San Nopco Limited, SN Dispersant 5468), and 1 part by weight of a polyoxyalkylene surface active agent (made by San Nopco Limited, SN Wet 980) were uniformly dispersed in 150 parts by mass of water to prepare a coating liquid, and a porous layer having a thickness of 6 μm was formed on the polyolefin resin porous film.

Example 1-8

47.5 parts by mass of a homopolymer polyethylene having an Mv of 700,000, 47.5 parts by mass of a homopolymer polyethylene having an Mv of 250,000, and 5 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of 7.59×10$^5$ m$^2$/s at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 1300 μm.

Next, the polyolefin composition was guided to a simultaneous biaxial tenter stretching machine, and subjected to simultaneous biaxial stretching 7 times in the MD and 6.4 times in the TD. At this time, the preset temperature of the simultaneous biaxial tenter was 118° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 122° C., and the TD relaxation rate was 0.80. As a result, a polyolefin resin porous film having a film thickness of 16 μm, a porosity of 49%, and an air permeability of 155 seconds/100 cc was obtained.

Next, 98.2 parts by mass of calcined kaolin 2 in Table 1 and 1.8 parts by mass of polyvinyl alcohol (the average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 5 μm was formed on the polyolefin resin porous film.

Example 1-9

A multilayer porous film was obtained in the same manner as that in Example 1-6 except that the film thickness of the porous film was 12 μm, the porosity thereof was 40%, and the air permeability thereof was 120 seconds/100 cc.

Example 1-10

A multilayer porous film was obtained in the same manner as that in Example 1-9 except that 97.0 parts by weight of calcined kaolin 2 in Table 1 and 3.0 parts by weight of polyvinyl alcohol (the average degree of polymerization of 1700 and the degree of saponification of not less than 99%) were uniformly dispersed in 150 parts by weight of water to prepare a coating liquid.

Example 1-11

A multilayer porous film was obtained in the same manner as that in Example 1-10 except that the film thickness of the porous film was 20 μm, the porosity thereof was 40%, the air permeability thereof was 280 seconds/100 cc, and the thickness of the porous layer was 7 μm.

Example 1-12

A multilayer porous film was obtained in the same manner as that in Example 1-1 except that 97.5 parts by weight of synthetic aluminum silicate 2 in Table 1 and 2.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 6 μm was formed on the polyolefin resin porous film.

Example 1-13

A multilayer porous film was obtained in the same manner as that in Example 1-12 except that synthetic aluminum silicate 3 in Table 1 was used.

Example 1-14

A multilayer porous film was obtained in the same manner as that in Example 1-9 except that 95.0 parts by weight of kaolin 7 in Table 1 and 5.0 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 5 μm was formed on the polyolefin resin porous film.

Example 1-15

A multilayer porous film was obtained in the same manner as that in Example 1-1 except that 97.5 parts by weight of kaolin 4 in Table 1 and 2.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 7 μm was formed on the polyolefin resin porous film.

Example 1-16

A multilayer porous film was obtained in the same manner as that in Example 1-1 except that kaolin 5 in Table 1 was used to form a porous layer having a thickness of 7 μm on the polyolefin resin porous film.

Example 1-17

A multilayer porous film was obtained in the same manner as that in Example 1-15 except that kaolin 6 in Table 1 was used.

Example 1-18

A multilayer porous film was obtained in the same manner as that in Example 1-15 except that synthetic aluminum silicate 1 in Table 1 was used to form a porous layer having a thickness of 10 μm on the polyolefin resin porous film.

Example 1-19

A multilayer porous film was obtained in the same manner as that in Example 1-7 except that a porous layer having a thickness of 3 μm was formed on one surface of the polyolefin resin porous film, and an additional porous layer having a thickness of 3 μm was formed on the other surface of the same polyolefin resin porous film to form a porous layer having a thickness of 3 μm each and a thickness of 6 μm in total on the both surfaces of the polyolefin resin porous film.

Comparative Example 1-1

A porous film was obtained in the same manner as that in Example 1-1 except that no porous layer was formed.

Comparative Example 1-2

A porous film was obtained in the same manner as that in Example 1-8 except that no porous layer was formed.

Comparative Example 1-3

A porous film was obtained in the same manner as that in Example 1-9 except that no porous layer was formed.

Comparative Example 1-4

A porous film was obtained in the same manner as that in Example 1-11 except that no porous layer was formed.

Table 2 shows the air permeability, air permeability increasing rate, thermal shrinkage rate at 150° C., shutdown temperature, and short-circuit temperature of the multilayer porous films prepared by Examples 1-1 to 1-19 and Comparative Examples 1-1 to 1-4.

The porous films of Comparative Examples 1-1 to 1-4 without a formed porous layer showed a very large value of the thermal shrinkage rate at 150° C. exceeding 50%.

On the other hand, the multilayer porous films of Examples 1-15 to 1-18, in which a porous layer was formed using the particles containing an aluminum silicate compound as a main component less than 2% of which had a particle size of more than 0.2 μm and not more than 1.4 μm, had a more suppressed thermal shrinkage rate at 150° C. than that of the porous films of Comparative Examples 1-1 to 1-4 without a formed porous layer. Even at a thickness of the porous layer of not less than 7 μm, the thermal shrinkage rate at 150° C. in the multilayer porous films of Examples 1-15 to 1-18 was not less than 15% in the MD and in the TD.

In contrast, the multilayer porous films of Examples 1-1 to 1-14 and 1-19, in which a porous layer was formed using the particles containing an aluminum silicate compound as a main component not less than 2% of which had a particle size of more than 0.2 μm and not more than 1.4 μm, had a very small thermal shrinkage rate of not more than 5% at 150° C. both in the MD and in the TD although the alumina porous layer was as thin as 3 to 7 μm, and showed high resistance against thermal shrinkage.

The multilayer porous films or porous films of Examples 1-1 to 1-19 and Comparative Examples 1-1 to 1-4 had a shutdown temperature of 145 to 148° C., and favorable shutdown function. While the porous films of Comparative Examples 1-1 to 1-4 without a formed porous layer caused a short circuit only by heating to a temperature higher than the shutdown temperature by several ° C., the multilayer porous films of Examples 1-1 to 1-19, in which the porous layer composed of the particles containing an aluminum silicate compound as a main component was formed, all did not cause a short circuit by heating to not less than 200° C., and had very high heat resistance.

Each of the multilayer porous films of Examples 1-1 to 1-14 and 1-19 had a small air permeability of not more than 300 seconds/100 CC. Particularly, the air permeability increasing rate could be reduced to not more than 100% compared with the porous films of Comparative Examples 1-1 to 1-4 without a formed porous layer.

The simple batteries using the multilayer porous films or porous films of Examples 1-1 to 1-19 and Comparative Examples 1-1 to 1-4 as a separator each showed the rate characteristics and cycle characteristics of not less than 90%. From this, it was recognized that the multilayer porous films or porous films produced according to Examples 1-1 to 1-19 and Comparative Examples 1-1 to 1-4 can be used as a separator for batteries.

TABLE 1

| | Particle size distribution (vol %) | | | | | | | | | | | |
|---|---|---|---|---|---|---|---|---|---|---|---|---|
| | Up to 0.2 μm | Up to 0.4 μm | Up to 0.5 μm | Up to 0.6 μm | Up to 0.8 μm | Up to 1.0 μm | Up to 1.2 μm | Up to 1.4 μm | Up to 1.6 μm | Up to 2.0 μm | Up to 5.0 μm | More than 5.0 μm |
| Kaolin 1 | 54.0 | 27.0 | 8.0 | 3.9 | 3.0 | 1.0 | 1.0 | 0.8 | 1.0 | 0.0 | 0.2 | 0.0 |
| Kaolin 2 | 25.0 | 31.0 | 13.0 | 8.0 | 7.0 | 3.0 | 2.1 | 2.1 | 2.0 | 2.0 | 4.6 | 0.0 |
| Kaolin 3 | 0.0 | 0.0 | 0.0 | 0.4 | 0.7 | 1.0 | 1.1 | 1.8 | 3.0 | 8.0 | 46.0 | 38.0 |
| Kaolin 4 | 0.0 | 0.2 | 0.0 | 0.0 | 0.0 | 0.0 | 0.0 | 0.4 | 0.5 | 3.5 | 46.8 | 48.8 |
| Kaolin 5 | 0.0 | 0.0 | 0.0 | 0.0 | 0.0 | 0.0 | 0.0 | 0.0 | 1.0 | 2.0 | 42.0 | 55.0 |
| Kaolin 6 | 0.0 | 0.0 | 0.0 | 0.4 | 0.0 | 0.0 | 0.0 | 0.6 | 0.6 | 5.0 | 51.0 | 42.0 |
| Kaolin 7 | 0.0 | 0.0 | 0.0 | 0.0 | 0.2 | 1.3 | 2.0 | 3.8 | 2.8 | 12.2 | 63.1 | 14.5 |
| Calcined kaolin 1 | 0.0 | 0.0 | 0.5 | 1.1 | 2.7 | 4.4 | 4.0 | 6.2 | 3.9 | 14.2 | 52.2 | 10.3 |
| Calcined kaolin 2 | 0.0 | 1.3 | 5.0 | 5.6 | 8.5 | 7.4 | 5.1 | 5.8 | 3.3 | 11.7 | 41.9 | 4.5 |
| Synthetic aluminum silicate 1 | 0.0 | 0.0 | 0.0 | 0.0 | 0.0 | 0.0 | 0.0 | 0.5 | 1.0 | 1.7 | 7.0 | 90.0 |
| Synthetic aluminum silicate 2 | 0.0 | 1.4 | 0.6 | 1.2 | 1.3 | 0.0 | 2.0 | 1.6 | 2.2 | 6.5 | 25.7 | 57.1 |
| Synthetic aluminum silicate 3 | 6.7 | 28.7 | 3.2 | 3.9 | 2.4 | 2.4 | 1.5 | 1.9 | 2.5 | 6.4 | 18.2 | 22.1 |

| | Particle size distribution (vol %) | | | | Average |
|---|---|---|---|---|---|
| | 0.2-1.4 μm | 0.2-1.0 μm | 0.5-2.0 μm | 0.6-1.4 μm | particle size (μm) |
| Kaolin 1 | 44.6 | 42.9 | 10.6 | 5.8 | 0.15 |
| Kaolin 2 | 66.2 | 62.0 | 26.2 | 14.2 | 0.52 |
| Kaolin 3 | 5.0 | 2.1 | 16.0 | 4.7 | 3.88 |
| Kaolin 4 | 0.6 | 0.2 | 4.4 | 0.4 | 4.55 |
| Kaolin 5 | 0.0 | 0.0 | 3.0 | 0.0 | 5.16 |
| Kaolin 6 | 1.0 | 0.4 | 6.6 | 0.6 | 4.23 |
| Kaolin 7 | 7.3 | 1.5 | 22.3 | 7.3 | 2.89 |
| Calcined kaolin 1 | 18.9 | 8.7 | 36.5 | 17.3 | 2.40 |
| Calcined kaolin 2 | 38.7 | 27.8 | 47.4 | 26.8 | 1.83 |
| Synthetic aluminum silicate 1 | 0.5 | 0.0 | 3.2 | 0.5 | 14.25 |

TABLE 1-continued

| | | | | | |
|---|---|---|---|---|---|
| Synthetic aluminum silicate 2 | 8.1 | 4.5 | 14.8 | 5.0 | 5.48 |
| Synthetic aluminum silicate 3 | 44.1 | 40.6 | 21.1 | 8.3 | 1.24 |

TABLE 2

| | Porous film | | | Porous layer | | | | | | Binder | | Thickness |
|---|---|---|---|---|---|---|---|---|---|---|---|---|
| | | | | Inorganic particles | | | | | | | | |
| | Film | | Air | | | Particle size distribution (vol %) | | | | | Proportion | of porous |
| | thickness (μm) | Porosity (%) | permeability (sec/100 cc) | Kind | | 0.2-1.4 μm | 0.2-1.0 μm | 0.5-2.0 μm | 0.6-1.4 μm | Kind | of binder (%) | layer (μm) |
| Example 1-1 | 16 | 40 | 160 | Kaolin 1 | | 44.6 | 42.9 | 10.6 | 5.8 | PVA | 1.8 | 4 |
| Example 1-2 | 16 | 40 | 160 | Kaolin 2 | | 66.2 | 62.0 | 26.2 | 14.2 | PVA | 1.8 | 3 |
| Example 1-3 | 16 | 40 | 160 | Kaolin 3 | | 5.0 | 2.1 | 16.0 | 4.7 | PVA | 1.8 | 4 |
| Example 1-4 | 16 | 40 | 160 | Kaolin 7 | | 7.3 | 1.5 | 22.3 | 7.3 | PVA | 2.5 | 5 |
| Example 1-5 | 16 | 40 | 160 | Calcined kaolin 1 | | 18.9 | 8.7 | 36.5 | 17.3 | PVA | 3.0 | 4 |
| Example 1-6 | 16 | 40 | 160 | Calcined kaolin 2 | | 38.7 | 27.8 | 47.4 | 26.8 | PVA | 1.8 | 4 |
| Example 1-7 | 16 | 40 | 160 | Calcined kaolin 2 | | 38.7 | 27.8 | 47.4 | 26.8 | AclLTX | 5.0 | 6 |
| Example 1-8 | 16 | 49 | 155 | Calcined kaolin 2 | | 38.7 | 27.8 | 47.4 | 26.8 | PVA | 1.8 | 5 |
| Example 1-9 | 12 | 40 | 120 | Calcined kaolin 2 | | 38.7 | 27.8 | 47.4 | 26.8 | PVA | 1.8 | 4 |
| Example 1-10 | 12 | 40 | 120 | Calcined kaolin 2 | | 38.7 | 27.8 | 47.4 | 26.8 | PVA | 3.0 | 4 |
| Example 1-11 | 20 | 40 | 280 | Calcined kaolin 2 | | 38.7 | 27.8 | 47.4 | 26.8 | PVA | 3.0 | 7 |
| Example 1-12 | 16 | 40 | 160 | Synthetic aluminum silicate 2 | | 8.1 | 4.5 | 14.8 | 5.0 | PVA | 2.5 | 6 |
| Example 1-13 | 16 | 40 | 160 | Synthetic aluminum silicate 3 | | 44.1 | 40.6 | 21.1 | 8.3 | PVA | 2.5 | 6 |
| Example 1-14 | 12 | 40 | 120 | Kaolin 7 | | 7.3 | 1.5 | 22.3 | 7.3 | PVA | 5.0 | 5 |
| Example 1-15 | 16 | 40 | 160 | Kaolin 4 | | 0.6 | 0.2 | 4.4 | 0.4 | PVA | 2.5 | 7 |
| Example 1-16 | 16 | 40 | 160 | Kaolin 5 | | 0.0 | 0.0 | 3.0 | 0.0 | PVA | 1.8 | 7 |
| Example 1-17 | 16 | 40 | 160 | Kaolin 6 | | 1.0 | 0.4 | 6.6 | 0.6 | PVA | 2.5 | 7 |
| Example 1-18 | 16 | 40 | 160 | Synthetic aluminum silicate 1 | | 0.5 | 0.0 | 3.2 | 0.5 | PVA | 2.5 | 10 |
| Example 1-19 | 16 | 40 | 160 | Calcined kaolin 2 | | 38.7 | 27.8 | 47.4 | 26.8 | AclLTX | 5.0 | 6 |
| Comparative Example 1-1 | 16 | 40 | 160 | None | | — | — | — | — | — | — | — |
| Comparative Example 1-2 | 16 | 49 | 155 | None | | — | — | — | — | — | — | — |
| Comparative Example 1-3 | 12 | 40 | 120 | None | | — | — | — | — | — | — | — |
| Comparative Example 1-4 | 20 | 40 | 280 | None | | — | — | — | — | — | — | — |

| | Multilayer porous film | | | | | |
|---|---|---|---|---|---|---|
| | Air permeability | Air permeability | Thermal shrinkage rate at 150° C. | | Shutdown temperature | Short-circuit temperature |
| | (sec/100 cc) | increasing rate (%) | MD (%) | TD (%) | (° C.) | (° C.) |
| Example 1-1 | 210 | 31 | 1 | 0 | 145 | >200 |
| Example 1-2 | 235 | 47 | 1 | 1 | 145 | >200 |
| Example 1-3 | 275 | 72 | 1 | 0 | 145 | >200 |
| Example 1-4 | 160 | 0 | 1 | 1 | 146 | >200 |
| Example 1-5 | 160 | 0 | 1 | 1 | 145 | >200 |
| Example 1-6 | 162 | 1 | 2 | 1 | 145 | >200 |
| Example 1-7 | 180 | 13 | 3 | 1 | 145 | >200 |
| Example 1-8 | 190 | 23 | 1 | 1 | 148 | >200 |
| Example 1-9 | 144 | 20 | 1 | 2 | 148 | >200 |
| Example 1-10 | 150 | 25 | 1 | 1 | 148 | >200 |

TABLE 2-continued

| | | | | | | |
|---|---|---|---|---|---|---|
| Example 1-11 | 285 | 2 | 3 | 3 | 148 | >200 |
| Example 1-12 | 190 | 19 | 5 | 2 | 145 | >200 |
| Example 1-13 | 205 | 28 | 3 | 2 | 145 | >200 |
| Example 1-14 | 180 | 50 | 1 | 2 | 148 | >200 |
| Example 1-15 | 162 | 1 | 30 | 32 | 145 | >200 |
| Example 1-16 | 300 | 88 | 19 | 15 | 145 | >200 |
| Example 1-17 | 165 | 3 | 41 | 35 | 145 | >200 |
| Example 1-18 | 185 | 16 | 36 | 20 | 145 | >200 |
| Example 1-19 | 168 | 5 | 3 | 1 | 145 | >200 |
| Comparative Example 1-1 | 160 | 0 | 60 | 50 | 145 | 155 |
| Comparative Example 1-2 | 155 | 0 | 73 | 53 | 148 | 152 |
| Comparative Example 1-3 | 120 | 0 | 67 | 67 | 148 | 154 |
| Comparative Example 1-4 | 280 | 0 | 63 | 47 | 148 | 154 |

Particles containing an aluminum silicate compound as main component and used in Examples 2-1 to 2-20 and Comparative Examples 2-1 to 2-4 are as follows.

Kaolins 1, 2, 3, 5, and 8: an aluminosilicate mineral containing kaolinite ($Al_2Si_2O_5(OH)_4$) as a main component.

Kaolins 4, 6, and 7: an aluminosilicate mineral containing pyrophyllite ($Al_2Si_4O_{10}(OH)_2$) as a main component. Kaolins 4 and 6 are prepared by wet grinding of kaolin 7 by a bead mill.

Calcined kaolin 1 and 2: prepared by calcining kaolin containing kaolinite as a main component at a high temperature. Calcined kaolin 1 is prepared by wet grinding of calcined kaolin 2 by a bead mill.

Synthetic aluminum silicates 1, 2, and 3: a chemically synthesized aluminum silicate. Synthetic aluminum silicates 1 and 2 are prepared by wet grinding of synthetic aluminum silicate 3 by a bead mill.

Table 3 shows the average particle size of each particle.

Example 2-1

47 parts by mass of a homopolymer polyethylene having an Mv of 700,000, 46 parts by mass of a homopolymer polyethylene having an Mv of 250,000, and 7 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ $m^2/s$ at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 2000 μm.

Next, the polyolefin composition was guided to a simultaneous biaxial tenter stretching machine, and subjected to simultaneous biaxial stretching 7 times in the MD and 7 times in the TD. At this time, the preset temperature of the simultaneous biaxial tenter was 125° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 133° C., and the TD relaxation rate was 0.80. As a result, a polyolefin resin porous film having a film thickness of 16 μm, a porosity of 40%, and an air permeability of 160 seconds/100 cc was obtained.

Next, 98.2 parts by mass of kaolin 1 and 1.8 parts by mass of polyvinyl alcohol (hereinafter, abbreviated to "PVA" in some cases. The average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 3 μm was formed on the polyolefin resin porous film.

Example 2-2

A multilayer porous film was obtained in the same manner as that in Example 2-1 except that kaolin 2 was used, and the thickness of the porous layer was 4 μm.

Example 2-3

A multilayer porous film was obtained in the same manner as that in Example 2-1 except that 97.0 parts by weight of synthetic aluminum silicate 1 and 3.0 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 6 μm was formed on the polyolefin resin porous film.

Example 2-4

A multilayer porous film was obtained in the same manner as that in Example 2-2 except that 97.5 parts by weight of calcined kaolin 1 and 2.5 parts by weight of polyvinyl alcohol (the average degree of polymerization of 1700 and the degree of saponification of not less than 99%) were uniformly dispersed in 150 parts by weight of water to prepare a coating liquid.

Example 2-5

A multilayer porous film was obtained in the same manner as that in Example 2-2 except that kaolin 3 was used.

Example 2-6

A multilayer porous film was obtained in the same manner as that in Example 2-3 except that calcined kaolin 2 was used, and the thickness of the porous layer was 5 μm.

Example 2-7

A multilayer porous film was obtained in the same manner as that in Example 2-4 except that kaolin 4 was used, and the thickness of the porous layer was 6 μm.

Example 2-8

A multilayer porous film was obtained in the same manner as that in Example 2-1 except that kaolin 5 was used.

Example 2-9

A multilayer porous film was obtained in the same manner as that in Example 2-1 except that 95.0 parts by mass of calcined kaolin 1 and 5.0 parts by mass of an acrylic latex (hereinafter, abbreviated to "Acl" in some cases. The solid concentration of 40%, the average particle size of 90 nm, the lowest film-forming temperature of not more than 0° C.), 1 part by weight of a polycarboxylic acid ammonium aqueous solution (made by San Nopco Limited, SN Dispersant 5468), and 1 part by weight of a polyoxyalkylene surface active agent (made by San Nopco Limited, SN Wet 980) were uniformly dispersed in 150 parts by mass of water to prepare a coating liquid, and a porous layer having a thickness of 7 μm was formed on the polyolefin resin porous film.

Example 2-10

47.5 parts by mass of a homopolymer polyethylene having an Mv of 700,000, 47.5 parts by mass of a homopolymer polyethylene having an Mv of 250,000, and 5 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ m$^2$/s at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 1300 μm.

Next, the polyolefin composition was guided to a simultaneous biaxial tenter stretching machine, and subjected to simultaneous biaxial stretching 7 times in the MD and 6.4 times in the TD. At this time, the preset temperature of the simultaneous biaxial tenter was 118° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 122° C., and the TD relaxation rate was 0.80. As a result, a polyolefin resin porous film having a film thickness of 16 μm, a porosity of 49%, and an air permeability of 155 seconds/100 cc was obtained.

Next, 97.5 parts by mass of calcined kaolin 1 and 2.5 parts by mass of polyvinyl alcohol (the average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 5 μm was formed on the polyolefin resin porous film.

Example 2-11

A multilayer porous film was obtained in the same manner as that in Example 2-1 except that the film thickness of the porous film was 12 μm, the porosity thereof was 40%, and the air permeability thereof was 120 seconds/100 cc.

Example 2-12

A multilayer porous film was obtained in the same manner as that in Example 2-11 except that 97.0 parts by weight of calcined kaolin 1 and 3.0 parts by weight of polyvinyl alcohol (the average degree of polymerization of 1700 and the degree of saponification of not less than 99%) were uniformly dispersed in 150 parts by weight of water to prepare a coating liquid.

Example 2-13

A multilayer porous film was obtained in the same manner as that in Example 2-1 except that the film thickness of the porous film was 20 μm, the porosity thereof was 40%, and the air permeability thereof was 280 seconds/100 cc, and that 96.5 parts by weight of calcined kaolin 1 and 3.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 6 μm was formed on the polyolefin resin porous film.

Example 2-14

A multilayer porous film was obtained in the same manner as that in Example 2-11 except that 96.0 parts by weight of kaolin 4 and 4.0 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 4 μm was formed on the polyolefin resin porous film.

Example 2-15

A multilayer porous film was obtained in the same manner as that in Example 2-4 except that kaolin 6 was used to form a porous layer having a thickness of 7 μm on the polyolefin resin porous film.

Example 2-16

A multilayer porous film was obtained in the same manner as that in Example 2-15 except that kaolin 7 was used.

Example 2-17

A multilayer porous film was obtained in the same manner as that in Example 2-1 except that kaolin 8 was used to form a porous layer having a thickness of 7 μm on the polyolefin resin porous film.

Example 2-18

A multilayer porous film was obtained in the same manner as that in Example 2-3 except that synthetic aluminum silicate 2 was used to form a porous layer having a thickness of 7 μm on the polyolefin resin porous film.

Example 2-19

A multilayer porous film was obtained in the same manner as that in Example 2-4 except that synthetic aluminum silicate 3 was used to form a porous layer having a thickness of 10 μm on the polyolefin resin porous film.

Example 2-20

A multilayer porous film was obtained in the same manner as that in Example 2-9 except that a porous layer having a thickness of 3 μm was formed on one surface of the polyolefin resin porous film, and an additional porous layer having a thickness of 4 μm was formed on the other surface of the same polyolefin resin porous film to form a porous layer having a thickness of 7 μm in total on the both surfaces of the polyolefin resin porous film.

Comparative Example 2-1

A porous film was obtained in the same manner as that in Example 2-1 except that no porous layer was formed.

Comparative Example 2-2

A porous film was obtained in the same manner as that in Example 2-10 except that no porous layer was formed.

Comparative Example 2-3

A porous film was obtained in the same manner as that in Example 2-11 except that no porous layer was formed.

Comparative Example 2-4

A porous film was obtained in the same manner as that in Example 2-13 except that no porous layer was formed.

TABLE 3

|  | Porous film | | | Porous layer | | | | |
|---|---|---|---|---|---|---|---|---|
|  |  |  |  | Inorganic particles | | Binder | | |
|  | Film thickness (μm) | Porosity (%) | Air permeability (sec/100 cc) | Kind | Average particle size (μm) | Kind | Proportion of binder (%) | Thickness of porous layer (μm) |
| Example 2-1 | 16 | 40 | 160 | Kaolin 1 | 0.15 | PVA | 1.8 | 3 |
| Example 2-2 | 16 | 40 | 160 | Kaolin 2 | 0.52 | PVA | 1.8 | 4 |
| Example 2-3 | 16 | 40 | 160 | Synthetic aluminum silicate 1 | 1.38 | PVA | 3.0 | 6 |
| Example 2-4 | 16 | 40 | 160 | Calcined kaolin 1 | 1.67 | PVA | 2.5 | 4 |
| Example 2-5 | 16 | 40 | 160 | Kaolin 3 | 2.10 | PVA | 1.8 | 4 |
| Example 2-6 | 16 | 40 | 160 | Calcined kaolin 2 | 2.40 | PVA | 3.0 | 5 |
| Example 2-7 | 16 | 40 | 160 | Kaolin 4 | 2.71 | PVA | 2.5 | 6 |
| Example 2-8 | 16 | 40 | 160 | Kaolin 5 | 3.88 | PVA | 1.8 | 3 |
| Example 2-9 | 16 | 40 | 160 | Calcined kaolin 1 | 1.67 | Acl | 5.0 | 7 |
| Example 2-10 | 16 | 49 | 155 | Calcined kaolin 1 | 1.67 | PVA | 2.5 | 5 |
| Example 2-11 | 12 | 40 | 120 | Calcined kaolin 1 | 1.67 | PVA | 1.8 | 3 |
| Example 2-12 | 12 | 40 | 120 | Calcined kaolin 1 | 1.67 | PVA | 3.0 | 3 |
| Example 2-13 | 20 | 40 | 280 | Calcined kaolin 1 | 1.67 | PVA | 3.5 | 6 |
| Example 2-14 | 12 | 40 | 120 | Kaolin 4 | 2.71 | PVA | 4.0 | 4 |
| Example 2-15 | 16 | 40 | 160 | Kaolin 6 | 4.23 | PVA | 2.5 | 7 |
| Example 2-16 | 16 | 40 | 160 | Kaolin 7 | 4.55 | PVA | 2.5 | 7 |
| Example 2-17 | 16 | 40 | 160 | Kaolin 8 | 5.16 | PVA | 1.8 | 7 |
| Example 2-18 | 16 | 40 | 160 | Synthetic aluminum silicate 2 | 5.82 | PVA | 3.0 | 7 |
| Example 2-19 | 16 | 40 | 160 | Synthetic aluminum silicate 3 | 14.25 | PVA | 2.5 | 10 |
| Example 2-20 | 16 | 40 | 160 | Calcined kaolin 1 | 1.67 | Acl | 5.0 | 7 |
| Comparative Example 2-1 | 16 | 40 | 160 | None | — | — | — | — |
| Comparative Example 2-2 | 16 | 49 | 155 | None | — | — | — | — |
| Comparative Example 2-3 | 12 | 40 | 120 | None | — | — | — | — |
| Comparative Example 2-4 | 20 | 40 | 280 | None | — | — | — | — |

TABLE 3-continued

| | Multilayer porous film | | | | | |
|---|---|---|---|---|---|---|
| | Air permeability (sec/100 cc) | Air permeability increasing rate (%) | Thermal shrinkage rate at 150° C. | | Shutdown temperature (° C.) | Short-circuit temperature (° C.) |
| | | | MD (%) | TD (%) | | |
| Example 2-1 | 197 | 23 | 2 | 1 | 145 | >200 |
| Example 2-2 | 240 | 50 | 1 | 0 | 145 | >200 |
| Example 2-3 | 214 | 34 | 3 | 1 | 145 | >200 |
| Example 2-4 | 170 | 6 | 1 | 1 | 145 | >200 |
| Example 2-5 | 200 | 25 | 2 | 1 | 145 | >200 |
| Example 2-6 | 167 | 4 | 1 | 0 | 145 | >200 |
| Example 2-7 | 160 | 0 | 1 | 0 | 146 | >200 |
| Example 2-8 | 252 | 58 | 2 | 1 | 145 | >200 |
| Example 2-9 | 186 | 16 | 1 | 1 | 145 | >200 |
| Example 2-10 | 201 | 30 | 1 | 1 | 148 | >200 |
| Example 2-11 | 133 | 11 | 2 | 2 | 148 | >200 |
| Example 2-12 | 145 | 21 | 1 | 0 | 148 | >200 |
| Example 2-13 | 290 | 4 | 3 | 2 | 148 | >200 |
| Example 2-14 | 153 | 28 | 1 | 1 | 148 | >200 |
| Example 2-15 | 165 | 3 | 41 | 35 | 145 | >200 |
| Example 2-16 | 162 | 1 | 30 | 32 | 145 | >200 |
| Example 2-17 | 300 | 88 | 19 | 15 | 145 | >200 |
| Example 2-18 | 233 | 46 | 14 | 12 | 145 | >200 |
| Example 2-19 | 185 | 16 | 36 | 20 | 145 | >200 |
| Example 2-20 | 172 | 8 | 1 | 1 | 145 | >200 |
| Comparative Example 2-1 | 160 | 0 | 60 | 50 | 145 | 155 |
| Comparative Example 2-2 | 155 | 0 | 73 | 53 | 148 | 152 |
| Comparative Example 2-3 | 120 | 0 | 67 | 67 | 148 | 154 |
| Comparative Example 2-4 | 280 | 0 | 63 | 47 | 148 | 154 |

Table 3 shows the air permeability, air permeability increasing rate, thermal shrinkage rate at 150° C., shutdown temperature, and short-circuit temperature of the multilayer porous film produced in Examples 2-1 to 2-20 and Comparative Examples 2-1 to 2-4.

The porous films of Comparative Examples 2-1 to 2-4 without a formed porous layer showed a very large value of the thermal shrinkage rate at 150° C. exceeding 50%.

On the other hand, the multilayer porous films of Examples 2-15 to 2-19, in which the porous layer using the particles containing an aluminum silicate compound having the average particle size of less than 0.1 µm or greater than 4.0 µm as a main component was formed, had a more suppressed thermal shrinkage rate at 150° C. than that of the porous films of Comparative Examples 2-1 to 2-4 without a formed porous layer. Even at a thickness of the porous layer of not less than 7 µm, the thermal shrinkage rate at 150° C. in the multilayer porous films of Examples 2-15 to 2-19 was not less than 10% in the MD and in the TD.

In contrast, the multilayer porous film of Examples 2-1 to 2-14 and 2-20, in which the porous layer using the particles containing an aluminum silicate compound having the average particle size of more than 0.1 µm and not more than 4.0 µm as a main component was formed, had a very small thermal shrinkage rate of not more than 5% at 150° C. both in the MD and in the TD although the alumina porous layer was as thin as 3 to 7 µm, and showed high resistance against thermal shrinkage.

The multilayer porous films or porous films of Examples 2-1 to 2-20 and Comparative Examples 2-1 to 2-4 had a shutdown temperature of 145 to 148° C., and favorable shutdown function. While the porous films of Comparative Examples 2-1 to 2-4 without a formed porous layer caused a short circuit only by heating to a temperature higher than the shutdown temperature by several ° C., the multilayer porous films of Examples 2-1 to 2-20, in which the porous layer composed of the particles containing an aluminum silicate compound as a main component was formed, all did not cause a short circuit by heating to not less than 200° C., and had very high heat resistance.

Each of the multilayer porous films of Examples 2-1 to 2-14 and 2-20 had a small air permeability of not more than 300 seconds/100 CC. Particularly, the air permeability increasing rate could be reduced to not more than 60% compared with the porous films of Comparative Examples 2-1 to 2-4 without a formed porous layer.

The simple batteries using the multilayer porous films or porous films of Examples 2-1 to 2-20 and Comparative Examples 2-1 to 2-4 as a separator each showed the rate characteristics and cycle characteristics of not less than 90%. From this, it was recognized that the multilayer porous films or porous films produced according to Examples 2-1 to 2-20 and Comparative Examples 2-1 to 2-4 can be used as a separator for batteries.

Examples 3-1 to 3-5, Comparative Examples 3-1 to 3-2

The inorganic particles used in Examples 3-6 to 3-21 and Comparative Examples 3-3 to 3-8 are particles containing an aluminum silicate compound as a main component, silica, and alumina.

Calcined kaolins 1 and 2: prepared by calcining the kaolin containing kaolinite ($Al_2Si_2O_5(OH)_4$) as a main component at a high temperature.

Kaolins 1 and 2: an aluminosilicate mineral containing kaolinite ($Al_2Si_2O_5(OH)_4$) as main component.

Synthetic aluminum silicate: a chemically synthesized aluminum silicate.

Table 4 shows the average particle size, composition, X diffraction pattern of the inorganic particles used this time and presence of the heat caused by a reaction of the inorganic particles with the electrolyte solution.

Among the aluminum silicate compounds, calcined kaolin was found to have no peak due to the reaction heat with the electrolyte solution, and showed the result equal to that of alumina, which is known for high chemical stability.

Example 3-6

47 parts by mass of a homopolymer polyethylene having an Mv of 700,000, 46 parts by mass of a homopolymer polyethylene having an Mv of 250,000, and 7 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ m$^2$/s at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 2000 μm.

Next, the polyolefin composition was guided to a simultaneous biaxial tenter stretching machine, and subjected to simultaneous biaxial stretching 7 times in the MD and 7 times in the TD. At this time, the preset temperature of the simultaneous biaxial tenter was 125° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 133° C., and the TD relaxation rate was 0.80. As a result, a polyolefin resin porous film having a film thickness of 16 μm, a porosity of 40%, and an air permeability of 160 seconds/100 cc was obtained.

Next, 98.0 parts by mass of calcined kaolin 1 and 2.0 parts by mass of polyvinyl alcohol (the average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 4 μm was formed on the polyolefin resin porous film.

Example 3-7

A multilayer porous film was obtained in the same manner as that in Example 3-6 except that 96.5 parts by weight of calcined kaolin 1 and 3.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 5 μm was formed on the polyolefin resin porous film.

Example 3-8

A multilayer porous film was obtained in the same manner as that in Example 3-6 except that calcined kaolin 3 prepared by wet grinding of calcined kaolin 1 by a bead mill was used.

Example 3-9

A multilayer porous film was obtained in the same manner as that in Example 3-6 except that 97.0 parts by weight of calcined kaolin 3 and 3.0 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 5 μm was formed on the polyolefin resin porous film.

Example 3-10

A multilayer porous film was obtained in the same manner as that in Example 3-6 except that 94.0 parts by mass of calcined kaolin 3, 6.0 parts by mass of an acrylic latex (the solid concentration of 40%, the average particle size of 90 nm, the lowest film-forming temperature of not more than 0° C.), 1 part by weight of a polycarboxylic acid ammonium aqueous solution (made by San Nopco Limited, SN Dispersant 5468), and 1 part by weight of a polyoxyalkylene surface active agent (made by San Nopco Limited, SN Wet 980) were uniformly dispersed in 150 parts by mass of water to prepare a coating liquid, and a porous layer having a thickness of 6 μm was formed on the polyolefin resin porous film.

Example 3-11

A multilayer porous film was obtained in the same manner as that in Example 3-6 except that 98.2 parts by weight of calcined kaolin 3 and 1.8 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 7 μm was formed on the polyolefin resin porous film.

Example 3-12

A multilayer porous film was obtained in the same manner as that in Example 3-9 except that a porous layer having a thickness of 8 μm was formed on the polyolefin resin porous film.

Example 3-13

A multilayer porous film was obtained in the same manner as that in Example 3-8 except that a porous layer having a thickness of 10 μm was formed on the polyolefin resin porous film.

Example 3-14

(Production of Porous Film)

47.5 parts by mass of a homopolymer polyethylene having an Mv of 700,000, 47.5 parts by mass of a homopolymer polyethylene having an Mv of 250,000, and 5 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl)propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ m$^2$/s at 37.78°) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 1300 μm.

Next, the polyolefin composition was guided to a simultaneous biaxial tenter stretching machine, and subjected to simultaneous biaxial stretching 7 times in the MD and 6.4 times in the TD. At this time, the preset temperature of the simultaneous biaxial tenter was 118° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 122° C., and the TD relaxation rate was 0.80. As a result, a polyolefin resin porous film having a film thickness of 16 μm, a porosity of 49%, and an air permeability of 155 seconds/100 cc was obtained.

Next, 98.0 parts by mass of calcined kaolin 3 and 2.0 parts by mass of polyvinyl alcohol (the average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 5 μm was formed on the polyolefin resin porous film.

Example 3-15

A multilayer porous film was obtained in the same manner as that in Example 3-6 except that the film thickness of the porous film was 12 μm, the porosity thereof was 40%, and the air permeability thereof was 120 seconds/100 cc, and that 97.5 parts by weight of calcined kaolin 3 and 2.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 3 μm was formed on the polyolefin resin porous film.

Example 3-16

A multilayer porous film was obtained in the same manner as that in Example 3-9 except that the film thickness of the porous film was 12 μm, the porosity thereof was 40%, and the air permeability thereof was 120 seconds/100 cc.

Example 3-17

A multilayer porous film was obtained in the same manner as that in Example 3-6 except that the film thickness of the porous film was 20 μm, the porosity thereof was 40%, and the air permeability thereof was 280 seconds/100 cc, and that 96.0 parts by weight of calcined kaolin 3 and 4.0 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 7 μm was formed on the polyolefin resin porous film.

Example 3-18

A multilayer porous film was obtained in the same manner as that in Example 3-11 except that kaolin 1 was used to form a porous layer having a thickness of 4 μm on the polyolefin resin porous film.

Example 3-19

A multilayer porous film was obtained in the same manner as that in Example 3-18 except that a porous layer having a thickness of 7 μm was formed on the polyolefin resin porous film.

Example 3-20

A multilayer porous film was obtained in the same manner as that in Example 3-18 except that kaolin 2 was used to form a porous layer having a thickness of 6 μm on the polyolefin resin porous film.

Example 3-21

A multilayer porous film was obtained in the same manner as that in Example 3-10 except that a porous layer having a thickness of 4 μm was formed on one surface of the polyolefin resin porous film, and an additional porous layer having a thickness of 4 μm was formed on the other surface of the same polyolefin resin porous film to form a porous layer having a thickness of 4 μm each a thickness of 8 μm in total on the both surfaces of the polyolefin resin porous film.

Comparative Example 3-3

A multilayer porous film was obtained in the same manner as that in Example 3-18 except that alumina was used.

Comparative Example 3-4

A multilayer porous film was obtained in the same manner as that in Comparative Example 3-3 except that a porous layer having a thickness of 7 μm was formed on the polyolefin resin porous film.

Comparative Example 3-5

A porous film was obtained in the same manner as that in Example 3-6 except that no porous layer was formed.

Comparative Example 3-6

A porous film was obtained in the same manner as that in Example 3-14 except that no porous layer was formed.

Comparative Example 3-7

A porous film was obtained in the same manner as that in Example 3-15 except that no porous layer was formed.

Comparative Example 3-8

A porous film was obtained in the same manner as that in Example 3-17 except that no porous layer was formed.

TABLE 4

Figure 2:
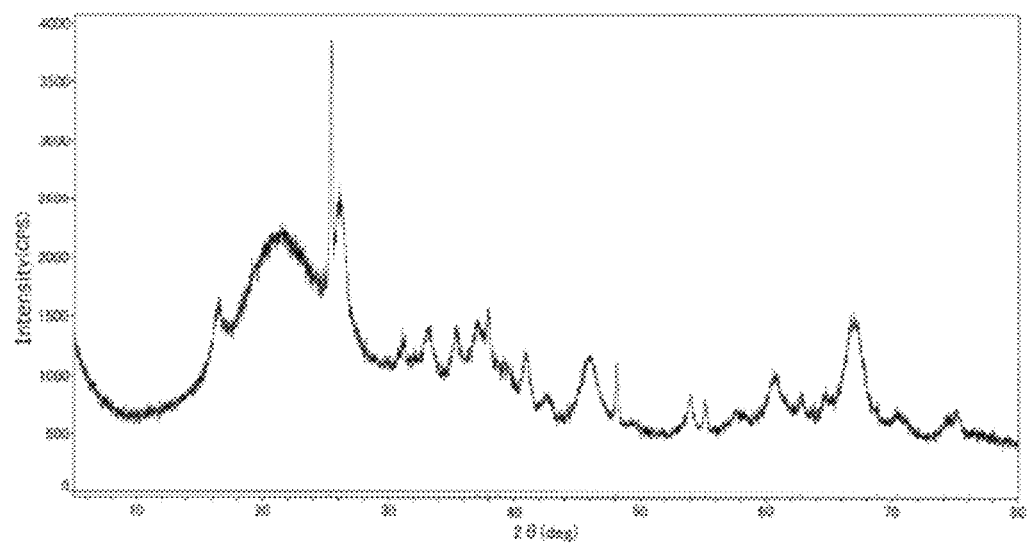
FIG. 2 shows an X-ray diffraction pattern of calcined kaolin 1 used in Example 3-2.
Figure 3:
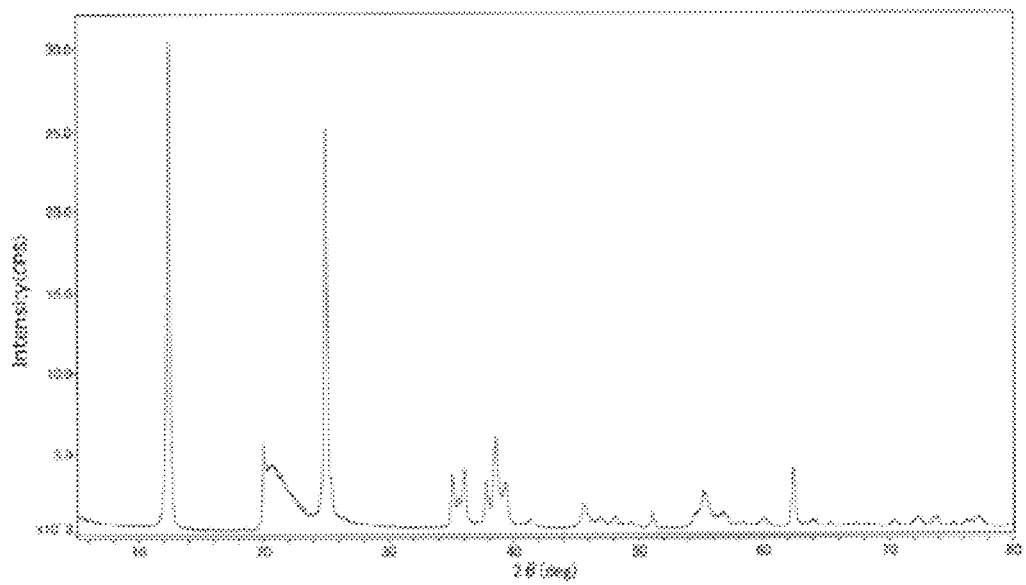
FIG. 3 shows an X-ray diffraction pattern of kaolin 1 used in Example 3-3.
Figure 4:
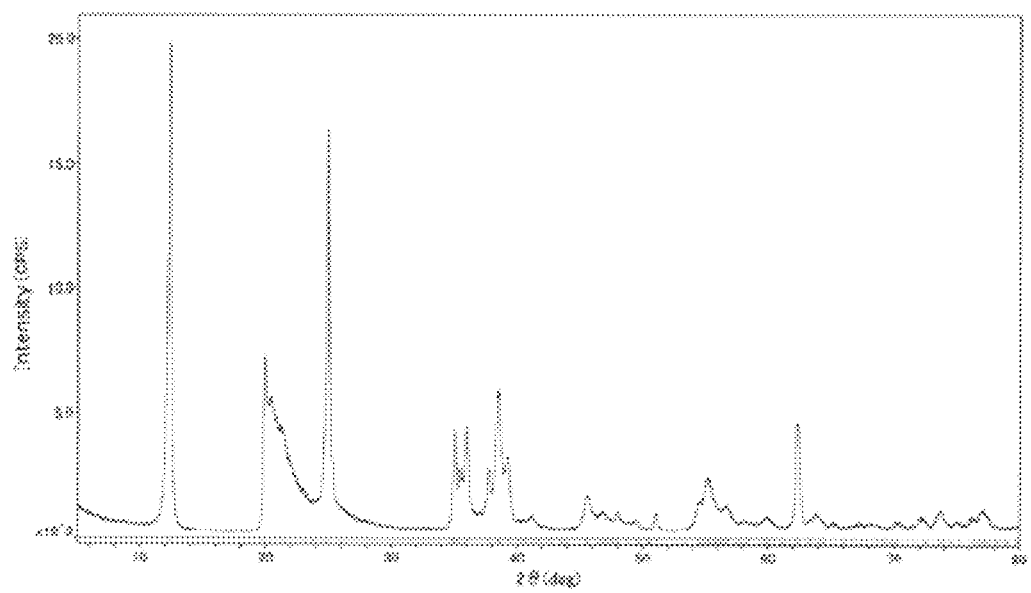
FIG. 4 shows an X-ray diffraction pattern of kaolin 2 used in Example 3-4.
Figure 5:
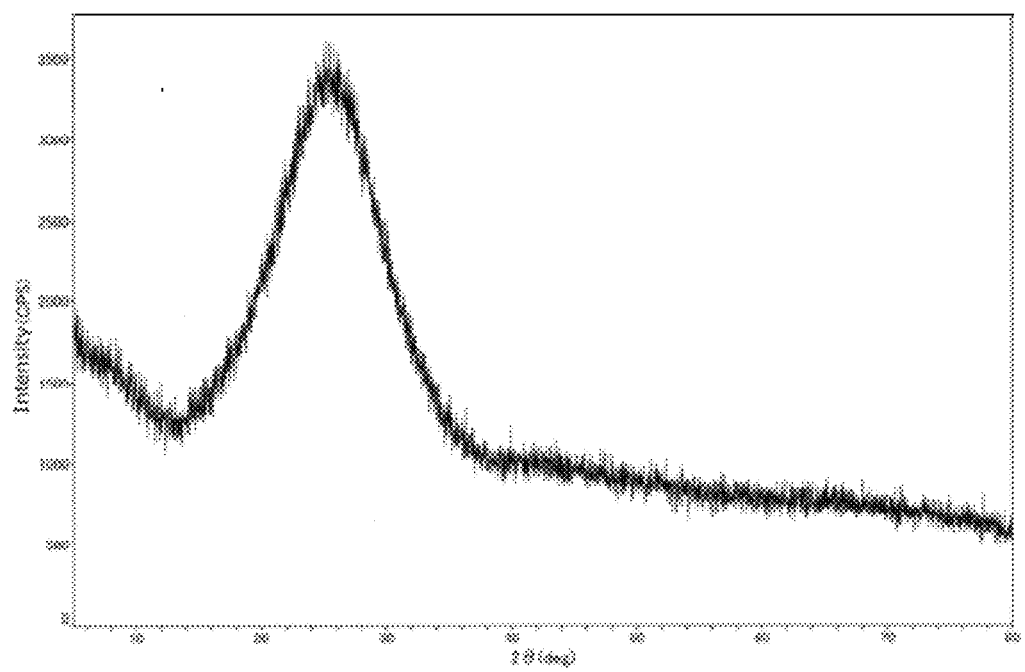
FIG. 5 shows an X-ray diffraction pattern of synthetic aluminum silicate used in Example 3-5.
Figure 6:
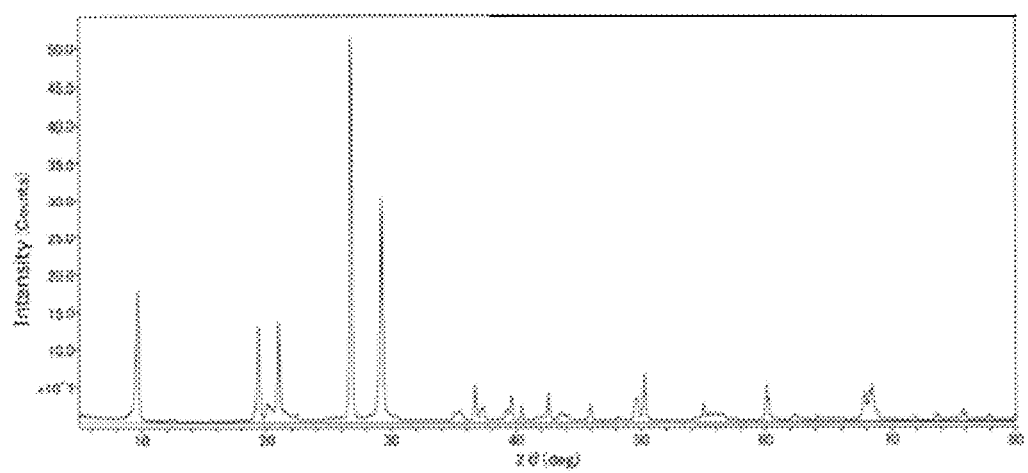
FIG. 6 shows an X-ray diffraction pattern of agalmatolite clay used in Example 4-1.
Figure 7:
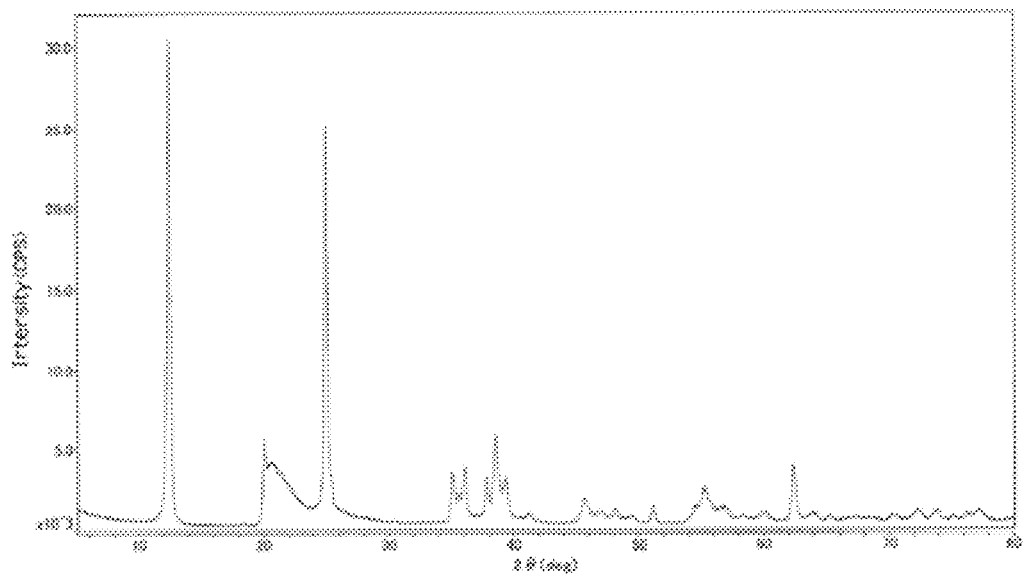
FIG. 7 shows an X-ray diffraction pattern of kaolin 1 used in Example 4-2.
Figure 8:
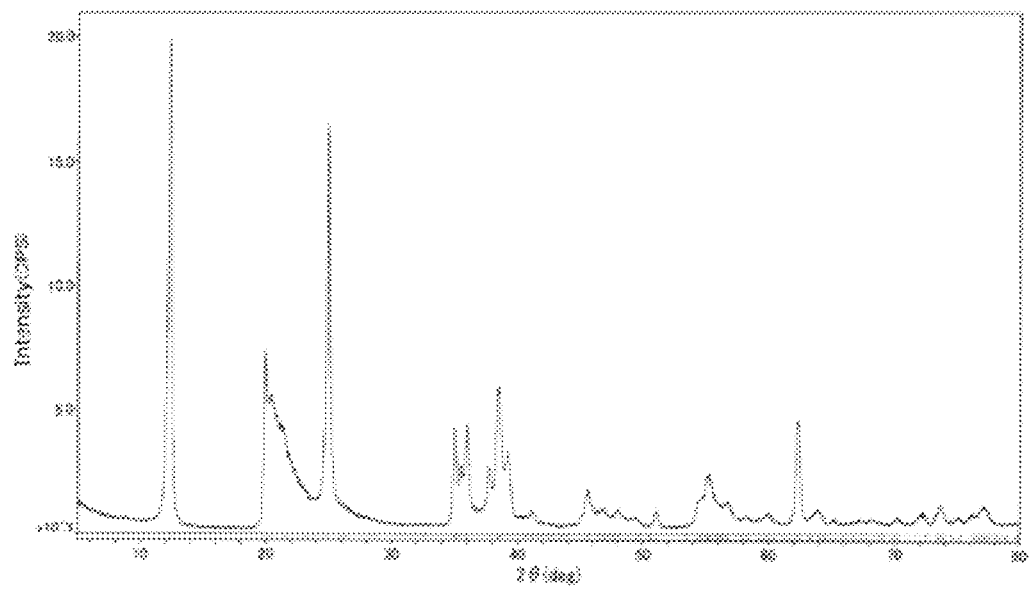
FIG. 8 shows an X-ray diffraction pattern of kaolin 2 used in Example 4-3.
Figure 9:
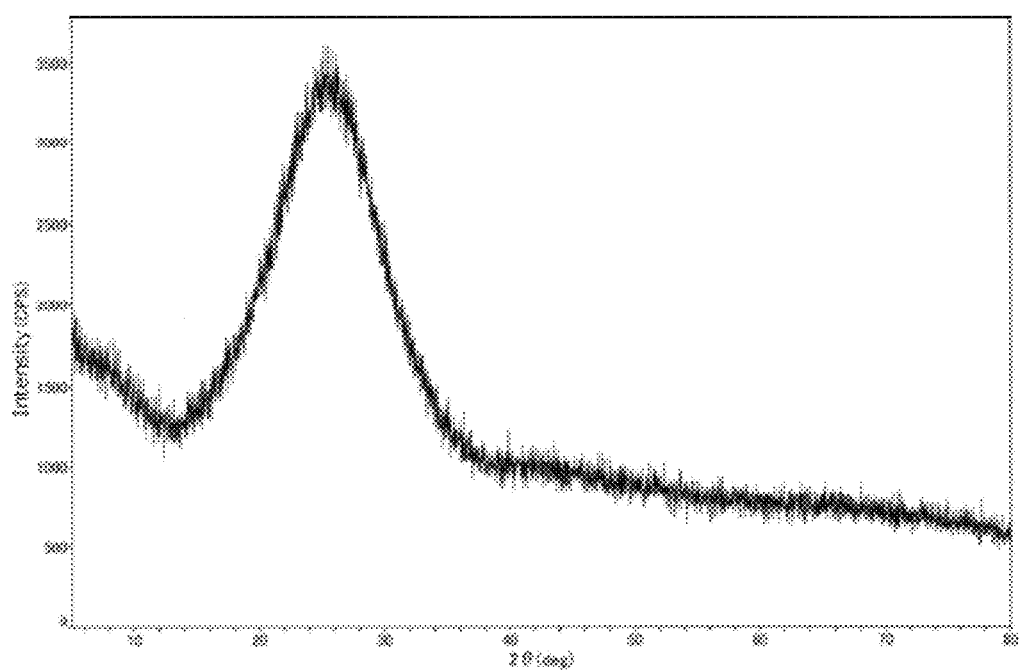
FIG. 9 shows an X-ray diffraction pattern of synthetic aluminum silicate used in Example 4-4.

|  | Kind | Average particle size (μm) | Composition calculated from X-ray fluorescence spectrometry | X diffraction pattern | Peak of heat by reaction with electrolyte solution |
|---|---|---|---|---|---|
| Example 3-1 | Calcined kaolin 1 | 2.47 | $Al_{2.0}Si_{2.0}O_{8.2}$ | FIG. 1 | None |
| Example 3-2 | Calcined kaolin 2 | 1.82 | $Al_{2.0}Si_{1.9}O_{8.2}$ | FIG. 2 | None |
| Example 3-3 | Kaolin 1 | 0.33 | $Al_{2.0}Si_{2.0}O_{10.5}$ | FIG. 3 | Exist |
| Example 3-4 | Kaolin 2 | 2.85 | $Al_{2.0}Si_{1.8}O_{10.0}$ | FIG. 4 | Exist |
| Example 3-5 | Synthetic aluminum silicate | 12.5 | $Al_{1.0}Si_{3.4}O_{11.9}$ | FIG. 5 | Exist |
| Comparative Example 3-1 | Silica | 1.26 | $Si_{1.0}O_{2.2}$ | — | Exist |
| Comparative Example 3-2 | Alumina | 0.72 | $Al_{2.0}O_{3.8}$ | — | None |

TABLE 5

|  | Porous film | | | Porous layer | | | | | |
|---|---|---|---|---|---|---|---|---|---|
|  | | | | Inorganic particles | | Binder | | | |
|  | Film thickness (μm) | Porosity (%) | Air permeability (sec/100 cc) | Kind | Average particle size (μm) | Kind | Proportion of binder (%) | Thickness of porous layer (μm) | Porous layer density (g/cm³) |
| Example 3-6 | 16 | 40 | 160 | Calcined kaolin 1 | 2.47 | PVA | 2.0 | 4 | 0.81 |
| Example 3-7 | 16 | 40 | 160 | Calcined kaolin 1 | 2.47 | PVA | 3.5 | 5 | 0.85 |
| Example 3-8 | 16 | 40 | 160 | Calcined kaolin 3 | 1.75 | PVA | 2.0 | 4 | 0.85 |
| Example 3-9 | 16 | 40 | 160 | Calcined kaolin 3 | 1.75 | PVA | 3.0 | 5 | 0.87 |
| Example 3-10 | 16 | 40 | 160 | Calcined kaolin 3 | 1.75 | Acl | 6.0 | 6 | 0.79 |
| Example 3-11 | 16 | 40 | 160 | Calcined kaolin 3 | 1.75 | PVA | 1.8 | 7 | 0.81 |
| Example 3-12 | 16 | 40 | 160 | Calcined kaolin 3 | 1.75 | PVA | 3.0 | 8 | 0.97 |
| Example 3-13 | 16 | 40 | 160 | Calcined kaolin 3 | 1.75 | PVA | 2.0 | 10 | 0.98 |
| Example 3-14 | 16 | 49 | 155 | Calcined kaolin 3 | 1.75 | PVA | 2.0 | 5 | 0.86 |
| Example 3-15 | 12 | 40 | 120 | Calcined kaolin 3 | 1.75 | PVA | 2.5 | 3 | 1.02 |
| Example 3-16 | 12 | 40 | 120 | Calcined kaolin 3 | 1.75 | PVA | 3.0 | 5 | 1.10 |
| Example 3-17 | 20 | 40 | 280 | Calcined kaolin 3 | 1.75 | PVA | 4.0 | 7 | 0.82 |
| Example 3-18 | 16 | 40 | 160 | Kaolin 1 | 0.33 | PVA | 1.8 | 4 | 1.41 |
| Example 3-19 | 16 | 40 | 160 | Kaolin 1 | 0.33 | PVA | 1.8 | 7 | 1.49 |
| Example 3-20 | 16 | 40 | 160 | Kaolin 2 | 2.85 | PVA | 1.8 | 6 | 1.33 |
| Example 3-21 | 16 | 40 | 160 | Calcined kaolin 3 | 1.75 | Acl | 6.0 | 8 | 0.79 |
| Comparative Example 3-3 | 16 | 40 | 160 | Alumina | 0.72 | PVA | 1.8 | 4 | 1.71 |
| Comparative Example 3-4 | 16 | 40 | 160 | Alumina | 0.72 | PVA | 1.8 | 7 | 1.71 |
| Comparative Example 3-5 | 16 | 40 | 160 | None | — | — | — | — | — |
| Comparative Example 3-6 | 16 | 49 | 155 | None | — | — | — | — | — |
| Comparative Example 3-7 | 12 | 40 | 120 | None | — | — | — | — | — |
| Comparative Example 3-8 | 20 | 40 | 280 | None | — | — | — | — | — |

TABLE 5-continued

| | Multilayer porous film | | | | | |
|---|---|---|---|---|---|---|
| | Air permeability (sec/100 cc) | Air permeability increasing rate (%) | Thermal shrinkage rate at 150° C. | | Shutdown temperature (° C.) | Short-circuit temperature (° C.) |
| | | | MD (%) | TD (%) | | |
| Example 3-6 | 162 | 1 | 2 | 2 | 145 | >200 |
| Example 3-7 | 180 | 13 | 1 | 0 | 145 | >200 |
| Example 3-8 | 163 | 2 | 2 | 1 | 145 | >200 |
| Example 3-9 | 170 | 6 | 1 | 1 | 145 | >200 |
| Example 3-10 | 182 | 14 | 3 | 2 | 145 | >200 |
| Example 3-11 | 165 | 3 | 1 | 0 | 145 | >200 |
| Example 3-12 | 200 | 25 | 1 | 0 | 145 | >200 |
| Example 3-13 | 215 | 34 | 0 | 0 | 145 | >200 |
| Example 3-14 | 194 | 25 | 1 | 1 | 148 | >200 |
| Example 3-15 | 140 | 17 | 1 | 1 | 148 | >200 |
| Example 3-16 | 155 | 29 | 1 | 0 | 148 | >200 |
| Example 3-17 | 288 | 3 | 3 | 2 | 148 | >200 |
| Example 3-18 | 232 | 45 | 1 | 1 | 145 | >200 |
| Example 3-19 | 280 | 75 | 1 | 0 | 145 | >200 |
| Example 3-20 | 271 | 69 | 1 | 1 | 145 | >200 |
| Example 3-21 | 174 | 9 | 1 | 0 | 145 | >200 |
| Comparative Example 3-3 | 177 | 11 | 5 | 3 | 145 | >200 |
| Comparative Example 3-4 | 185 | 16 | 2 | 1 | 145 | >200 |
| Comparative Example 3-5 | 160 | 0 | 60 | 50 | 145 | 155 |
| Comparative Example 3-6 | 155 | 0 | 73 | 53 | 148 | 152 |
| Comparative Example 3-7 | 120 | 0 | 67 | 67 | 148 | 154 |
| Comparative Example 3-8 | 280 | 0 | 63 | 47 | 148 | 154 |

Table 5 shows the porous layer density, air permeability, air permeability increasing rate, thermal shrinkage rate at 150° C., shutdown temperature, and short-circuit temperature of the multilayer porous film prepared in Examples 3-6 to 3-21 and Comparative Examples 3-3 to 3-8.

The porous films of Comparative Examples 3-5 to 3-8 without a formed porous layer showed a very large value of the thermal shrinkage rate at 150° C. exceeding 50%.

On the other hand, the multilayer porous films of Comparative Examples 3-3 and 3-4, in which the porous layer using the particles containing kaolin or alumina as a main component was formed, had a very small thermal shrinkage rate of not more than 5% at 150° C. both in the MD and in the TD although the porous layer was as thin as 4 to 7 μm, and showed high resistance against thermal shrinkage. The density of the porous layer, however, showed a value 1.6 to 2 times the density of the porous film (0.8 g/cm³), i.e., 1.3 to 1.5 g/cm³ in the case where the particles containing kaolin as a main component were used, and 1.7 g/cm³ in the case where the particles containing alumina with a large specific gravity as a main component were used.

In contrast, the multilayer porous films of Examples 3-6 to 3-17 and 3-21, in which a porous layer using the particles containing calcined kaolin as a main component was formed, had a very small thermal shrinkage rate of not more than 5% at 150° C. both in the MD and in the TD although the porous layer was as thin as 3 to 7 μm, as in Examples 3-18 to 3-20 and Comparative Examples 3-3 and 3-4, and showed high resistance against thermal shrinkage. In addition, the density of the porous layer showed a very small value approximately equal to to 1.4 times the density of the porous film (0.8 g/cm³), i.e., 0.8 to 1.1 cm³, which was significantly smaller than the density of the multilayer porous film using the particles containing kaolin with substantially the same specific gravity as that of calcined kaolin as a main component. This value did not change even if the thickness of the porous layer was thicker and approximately 10 μm.

Each of the multilayer porous films of Examples 3-6 to 3-17 and 3-21 had a small air permeability of not more than 300 seconds/100 CC. Particularly, the air permeability increasing rate was much smaller than the porous films of Comparative Examples 3-5 to 3-8 without a formed porous layer. The air permeability increasing rate could be reduced to not more than 30% at a thickness of the porous layer of not more than 7 μm, and not more than 40% even if the porous layer was thicker and approximately 10 μm. It shows that this is a significant reduction compared with the value around 50% shown by the multilayer porous films of Examples 3-18 to 3-21 in which the porous layer using the particles containing kaolin as a main component was formed.

The multilayer porous films or porous films of Examples 3-6 to 3-21 and Comparative Examples 3-3 to 3-8 had a shutdown temperature of 145 to 148° C., and favorable shutdown function. While the porous films of Comparative Examples 3-5 to 3-8 without a formed porous layer caused a short circuit only by heating to a temperature higher than the shutdown temperature by several ° C., the multilayer porous films of Examples 3-6 to 3-17 and 3-21 in which the porous layer composed of the particles containing calcined kaolin as a main component was formed and the multilayer porous films of Examples 3-18 to 3-20 and Comparative Examples 3-3 and 3-4 in which the porous layer using the particles containing kaolin or alumina as a main component was formed all did not cause a short circuit by heating to not less than 200° C., and had very high heat resistance.

The simple batteries using the multilayer porous films or porous films of Examples 3-6 to 3-21 and Comparative Examples 3-3 to 3-8 as a separator each showed the rate characteristics and cycle characteristics of not less than 90%. From this, it was recognized that the multilayer porous films or porous films produced according to Examples 3-6 to 3-21 and Comparative Examples 3-3 to 3-8 can be used as a separator for batteries.

Examples 4-1 to 4-4, Comparative Examples 4-1 to 4-2

The inorganic particle used in Examples 4-5 to 4-18 and Comparative Examples 4-3 to 4-6 are particles containing an aluminum silicate compound below as a main component, silica, and alumina.

Agalmatolite clay: an aluminosilicate mineral containing pyrophyllite ($Al_2Si_4O_{10}(OH)_2$) as a main component. A pharmacopeia grade product was used this time.

Kaolins 1 and 2: an aluminosilicate mineral containing kaolinite ($Al_2Si_2O_5(OH)_4$) as a main component.

Synthetic aluminum silicate: chemically synthesized aluminum silicate.

Table 6 shows the average particle size, composition, X diffraction pattern of the inorganic particles used this time and presence of the heat caused by a reaction of the inorganic particles with the electrolyte solution. Agalmatolite clay contains a large amount of Si and O. It was found from the X diffraction pattern that the agalmatolite clay contains quartz as impurities.

Among the aluminum silicate compounds, the agalmatolite clay was found to have no peak due to the reaction heat with the electrolyte solution, and showed the result equal to that of alumina, which is known for high chemical stability.

Example 4-5

(Production of Porous Film)

47 parts by mass of a homopolymer polyethylene having an Mv of 700,000, 46 parts by mass of a homopolymer polyethylene having an Mv of 250,000, and 7 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ $m^2/s$ at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 2000 μm.

Next, the polyolefin composition was guided to a simultaneous biaxial tenter stretching machine, and subjected to simultaneous biaxial stretching 7 times in the MD and 7 times in the TD. At this time, the preset temperature of the simultaneous biaxial tenter was 125° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 133° C., and the TD relaxation rate was 0.80. As a result, a polyolefin resin porous film having a film thickness of 16 μm, a porosity of 40%, and an air permeability of 160 seconds/100 cc was obtained.

Next, 97.0 parts by mass of agalmatolite clay and 3.0 parts by mass of polyvinyl alcohol (the average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 4 μm was formed on the polyolefin resin porous film.

Example 4-6

A multilayer porous film was obtained in the same manner as that in Example 4-5 except that 95.0 parts by weight of agalmatolite clay and 5.0 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 5 μm was formed on the polyolefin resin porous film.

Example 4-7

A multilayer porous film was obtained in the same manner as that in Example 4-5 except that a porous layer having a thickness of 6 μm was formed on the polyolefin resin porous film.

Example 4-8

A multilayer porous film was obtained in the same manner as that in Example 4-5 except that 97.5 parts by weight of agalmatolite clay and 2.5 parts by weight of polyvinyl alcohol (the average degree of polymerization of 1700 and the degree of saponification of not less than 99%) were uniformly dispersed in 150 parts by weight of water to prepare a coating liquid, and a porous layer having a thickness of 7 μm was formed on the polyolefin resin porous film.

Example 4-9

A multilayer porous film was obtained in the same manner as that in Example 4-8 except that a porous layer having a thickness of 8 μm was formed on the polyolefin resin porous film.

Example 4-10

A multilayer porous film was obtained in the same manner as that in Example 4-5 except that 94.0 parts by mass of agalmatolite clay, 6.0 parts by mass of an acrylic latex (the solid concentration of 40%, the average particle size of 90 nm, the lowest film-forming temperature of not more than 0° C.), 1 part by weight of a polycarboxylic acid ammonium aqueous solution (made by San Nopco Limited, SN Dispersant 5468), and 1 part by weight of a polyoxyalkylene surface active agent (made by San Nopco Limited, SN Wet 980) were uniformly dispersed in 150 parts by mass of water to prepare a coating liquid, and a porous layer having a thickness of 7 μm was formed on the polyolefin resin porous film.

Example 4-11

A multilayer porous film was obtained in the same manner as that in Example 4-7 except that a porous layer having a thickness of 10 μm was formed on the polyolefin resin porous film.

Example 4-12

(Production of Porous Film)

47.5 parts by mass of a homopolymer polyethylene having an Mv of 700,000, 47.5 parts by mass of a homopolymer polyethylene having an Mv of 250,000, and 5 parts by mass of a homopolymer polypropylene having an Mv of 400,000 were dry blended using a tumbler blender. 1% by mass of pentaerythrityl-tetrakis-[3-(3,5-di-t-butyl-4-hydroxyphenyl) propionate] as an antioxidant was added to 99% by mass of the obtained pure polymer mixture, and dry blended again using the tumbler blender. Thereby, a mixture of the polymers and the like was obtained. After replacement by nitrogen, the obtained mixture of the polymers and the like was fed to a twin screw extruder by a feeder under a nitrogen atmosphere. Liquid paraffin (kinematic viscosity of $7.59 \times 10^{-5}$ m$^2$/s at 37.78° C.) as a plasticizer was injected into a cylinder of the extruder by a plunger pump. The feeder and the pump were adjusted such that the proportion of the amount of the liquid paraffin based on that of the entire mixture to be molten, kneaded, and extruded might be 65% by mass. The melting and kneading conditions were a preset temperature of 200° C., a screw rotation speed of 240 rpm, and an amount of discharge of 12 kg/h.

Then, the molten and kneaded product was extruded through a T die onto a cooling roller whose surface temperature was controlled at 25° C., and casted to obtain a sheet-like polyolefin composition having a thickness of 1300 μm.

Next, the polyolefin composition was guided to a simultaneous biaxial tenter stretching machine, and subjected to simultaneous biaxial stretching 7 times in the MD and 6.4 times in the TD. At this time, the preset temperature of the simultaneous biaxial tenter was 118° C. Next, the stretched polyolefin composition was guided to a methyl ethyl ketone tank, and the liquid paraffin was extracted to be removed. Subsequently, methyl ethyl ketone was dried to be removed.

The polyolefin composition was further guided to a TD tenter heat setting machine, and subjected to heat setting. The heat setting temperature was 122° C., and the TD relaxation rate was 0.80. As a result, a polyolefin resin porous film having a film thickness of 16 μm, a porosity of 49%, and an air permeability of 155 seconds/100 cc was obtained.

Next, 97.0 parts by mass of agalmatolite clay and 3.0 parts by mass of polyvinyl alcohol (the average degree of polymerization of 1700 and the degree of saponification of not less than 99%) were uniformly dispersed in 150 parts by mass of water to prepare a coating liquid. The coating liquid was applied to the surface of the polyolefin resin porous film using a gravure coater. The coating liquid was dried at 60° C. to remove water. Thus, a multilayer porous film was obtained in which a porous layer having a thickness of 6 μm was formed on the polyolefin resin porous film.

Example 4-13

A multilayer porous film was obtained in the same manner as that in Example 4-6 except that the film thickness of the porous film was 12 μm, the porosity thereof was 40%, and the air permeability thereof was 120 seconds/100 cc.

Example 4-14

A multilayer porous film was obtained in the same manner as that in Example 4-6 except that the film thickness of the porous film was 20 μm, the porosity thereof was 40%, and the air permeability thereof was 280 seconds/100 cc, and a porous layer having a thickness of 7 μm was formed on the polyolefin resin porous film.

Example 4-15

A multilayer porous film was obtained in the same manner as that in Example 4-5 except that 98.2 parts by weight of kaolin 1 and 1.8 parts by weight of polyvinyl alcohol (the average degree of polymerization of 1700 and the degree of saponification of not less than 99%) were uniformly dispersed in 150 parts by weight of water to prepare a coating liquid.

Example 4-16

A multilayer porous film was obtained in the same manner as that in Example 4-15 except that a porous layer having a thickness of 7 μm was formed on the polyolefin resin porous film.

Example 4-17

A multilayer porous film was obtained in the same manner as that in Example 4-15 except that kaolin 2 was used, and a porous layer having a thickness of 6 μm was formed on the polyolefin resin porous film.

Example 4-18

A multilayer porous film was obtained in the same manner as that in Example 4-10 except that a porous layer having a thickness of 4 μm was formed on one surface of the polyolefin resin porous film, and an additional porous layer having a thickness of 4 μm was formed on the other surface of the same polyolefin resin porous film to form a porous layer having a thickness of 4 μm each a thickness of 8 μm in total on the both surfaces of the polyolefin resin porous film.

Comparative Example 4-3

A porous film was obtained in the same manner as that in Example 4-5 except that no porous layer was formed.

Comparative Example 4-4

A porous film was obtained in the same manner as that in Example 4-12 except that no porous layer was formed.

Comparative Example 4-5

A porous film was obtained in the same manner as that in Example 4-13 except that no porous layer was formed.

Comparative Example 4-6

A porous film was obtained in the same manner as that in Example 4-14 except that no porous layer was formed.

TABLE 6

| | Kind | Average particle size (μm) | Composition calculated from X-ray fluorescence spectrometry | X diffraction pattern | Peak of heat by reaction with electrolyte solution |
|---|---|---|---|---|---|
| Example 4-1 | Agalmatolite clay | 2.52 | $Al_{2.0}Si_{6.4}O_{18.6}$ | FIG. 1 | None |
| Example 4-2 | Kaolin 1 | 0.33 | $Al_{2.0}Si_{2.0}O_{10.5}$ | FIG. 2 | Exist |
| Example 4-3 | Kaolin 2 | 2.85 | $Al_{2.0}Si_{1.8}O_{10.0}$ | FIG. 3 | Exist |
| Example 4-4 | Synthetic aluminum silicate | 12.5 | $Al_{1.0}Si_{3.4}O_{11.9}$ | FIG. 4 | Exist |
| Comparative Example 4-1 | Silica | 1.26 | $Si_{1.0}O_{2.2}$ | — | Exist |
| Comparative Example 4-2 | Alumina | 0.72 | $Al_{2.0}O_{3.8}$ | — | None |

TABLE 7

| | Porous film | | | Porous layer | | | | | |
|---|---|---|---|---|---|---|---|---|---|
| | | | | Inorganic particles | | Binder | | Thickness of porous layer (μm) | Porous layer density (g/cm³) |
| | Film thickness (μm) | Porosity (%) | Air permeability (sec/100 cc) | Kind | Average particle size (μm) | Kind | Proportion of binder (%) | | |
| Example 4-5 | 16 | 40 | 160 | Agalmatolite clay | 2.52 | PVA | 3.0 | 4 | 0.88 |
| Example 4-6 | 16 | 40 | 160 | Agalmatolite clay | 2.52 | PVA | 5.0 | 5 | 0.92 |
| Example 4-7 | 16 | 40 | 160 | Agalmatolite clay | 2.52 | PVA | 3.0 | 6 | 0.86 |
| Example 4-8 | 16 | 40 | 160 | Agalmatolite clay | 2.52 | PVA | 2.5 | 7 | 0.71 |
| Example 4-9 | 16 | 40 | 160 | Agalmatolite clay | 2.52 | PVA | 2.5 | 8 | 0.78 |
| Example 4-10 | 16 | 40 | 160 | Agalmatolite clay | 2.52 | Acl | 6.0 | 7 | 0.79 |
| Example 4-11 | 16 | 40 | 160 | Agalmatolite clay | 2.52 | PVA | 3.0 | 10 | 0.85 |
| Example 4-12 | 16 | 49 | 155 | Agalmatolite clay | 2.52 | PVA | 3.0 | 6 | 0.85 |
| Example 4-13 | 12 | 40 | 120 | Agalmatolite clay | 2.52 | PVA | 5.0 | 5 | 0.87 |
| Example 4-14 | 20 | 40 | 280 | Agalmatolite clay | 2.52 | PVA | 5.0 | 7 | 0.94 |
| Example 4-15 | 16 | 40 | 160 | Kaolin 1 | 0.33 | PVA | 1.8 | 4 | 1.41 |
| Example 4-16 | 16 | 40 | 160 | Kaolin 1 | 0.33 | PVA | 1.8 | 7 | 1.49 |
| Example 4-17 | 16 | 40 | 160 | Kaolin 2 | 2.85 | PVA | 1.8 | 6 | 1.33 |
| Example 4-18 | 16 | 40 | 160 | Agalmatolite clay | 2.52 | Acl | 6.0 | 8 | 0.79 |
| Comparative Example 4-3 | 16 | 40 | 160 | None | — | — | — | — | — |
| Comparative Example 4-4 | 16 | 49 | 155 | None | — | — | — | — | — |
| Comparative Example 4-5 | 12 | 40 | 120 | None | — | — | — | — | — |
| Comparative Example 4-6 | 20 | 40 | 280 | None | — | — | — | — | — |

| | Multilayer porous film | | | | | |
|---|---|---|---|---|---|---|
| | Air permeability (sec/100 cc) | Air permeability increasing rate (%) | Thermal shrinkage rate at 150° C. | | Shutdown temperature (° C.) | Short-circuit temperature (° C.) |
| | | | MD (%) | TD (%) | | |
| Example 4-5 | 180 | 13 | 2 | 1 | 145 | >200 |
| Example 4-6 | 183 | 14 | 1 | 1 | 145 | >200 |
| Example 4-7 | 186 | 16 | 1 | 1 | 145 | >200 |
| Example 4-8 | 180 | 13 | 2 | 2 | 145 | >200 |
| Example 4-9 | 182 | 14 | 3 | 2 | 145 | >200 |
| Example 4-10 | 175 | 9 | 3 | 2 | 145 | >200 |
| Example 4-11 | 190 | 19 | 1 | 1 | 145 | >200 |
| Example 4-12 | 189 | 22 | 2 | 2 | 148 | >200 |

TABLE 7-continued

| | | | | | | |
|---|---|---|---|---|---|---|
| Example 4-13 | 165 | 38 | 2 | 2 | 148 | >200 |
| Example 4-14 | 295 | 5 | 3 | 3 | 148 | >200 |
| Example 4-15 | 232 | 45 | 1 | 1 | 145 | >200 |
| Example 4-16 | 280 | 75 | 1 | 0 | 145 | >200 |
| Example 4-17 | 271 | 69 | 1 | 1 | 145 | >200 |
| Example 4-18 | 170 | 6 | 1 | 0 | 145 | >200 |
| Comparative Example 4-3 | 160 | 0 | 60 | 50 | 145 | 155 |
| Comparative Example 4-4 | 155 | 0 | 73 | 53 | 148 | 152 |
| Comparative Example 4-5 | 120 | 0 | 67 | 67 | 148 | 154 |
| Comparative Example 4-6 | 280 | 0 | 63 | 47 | 148 | 154 |

Table 7 shows the porous layer density, air permeability, air permeability increasing rate, thermal shrinkage rate at 150° C., shutdown temperature, and short-circuit temperature of the multilayer porous film prepared in Examples 4-5 to 4-18 and Comparative Examples 4-3 to 4-6.

The porous films of Comparative Examples 4-3 to 4-6 without a formed porous layer showed a very large value of the thermal shrinkage rate at 150° C. exceeding 50%.

On the other hand, the multilayer porous films of Examples 4-15 to 4-17, in which the porous layer using the particles containing kaolin as a main component was formed, had a very small thermal shrinkage rate of not more than 5% at 150° C. both in the MD and in the TD although the porous layer was as thin as 4 to 7 μm, and showed high resistance against thermal shrinkage. In the case where the particles containing kaolin as a main component were used, however, the density of the porous layer was a much larger value than that of the porous film (0.8 g/cm³), i.e., 1.3 to 1.5 g/cm³.

In contrast, the multilayer porous films of Examples 4-5 to 4-14 and 4-18, in which a porous layer using the particles containing agalmatolite clay as a main component was formed, had a very small thermal shrinkage rate of not more than 5% at 150° C. both in the MD and in the TD although the porous layer was as thin as 3 to 7 μm, as in Examples 4-15 to 4-17, and showed high resistance against thermal shrinkage. In addition, the density of the porous layer showed a very small value approximately equal to 1.2 times the density of the porous film (0.8 g/cm³), i.e., 0.7 to 0.95 cm³, which was significantly smaller than the density of the multilayer porous film using the particles containing kaolin with substantially the same specific gravity as that of agalmatolite clay as a main component. This value did not change even if the thickness of the porous layer was thicker and approximately 10 μm.

Each of the multilayer porous films of Examples 4-5 to 4-14 and 4-18 had a small air permeability of not more than 300 seconds/100 CC. Particularly, the air permeability increasing rate was much smaller than that of the porous films of Comparative Examples 4-3 to 4-6 without a formed porous layer, and could be reduced to approximately 40% even if the porous layer was thicker and approximately 10 μm.

The multilayer porous films or porous films of Examples 4-5 to 4-18 and Comparative Examples 4-3 to 4-6 had a shutdown temperature of 145 to 148° C., and favorable shutdown function. While the porous films of Comparative Examples 4-3 to 4-6 without a formed porous layer caused a short circuit only by heating to a temperature higher than the shutdown temperature by several ° C., the multilayer porous films of Examples 4-5 to 4-14 and 4-18 in which the porous layer composed of the particles containing agalmatolite clay as a main component was formed and the multilayer porous films of Examples 4-15 to 4-17 in which the porous layer using the particles containing kaolin as a main component was formed all did not cause a short circuit by heating to not less than 200° C., and had very high heat resistance.

The simple batteries using the multilayer porous films or porous films of Examples 4-5 to 4-18 and Comparative Examples 4-3 to 4-6 as a separator each showed the rate characteristics and cycle characteristics of not less than 90%. From this, it was recognized that the multilayer porous films or porous films produced according to Examples 4-5 to 4-18 and Comparative Examples 4-3 to 4-6 can be used as a separator for batteries.

The present application is based on Japanese Patent Application Nos. 2009-123625 and 2009-123626, filed on May 21, 2009 to Japan Patent Office and Japanese Patent Application Nos. 2009-124117 and 2009-124118, filed on May 22, 2009 to Japan Patent Office, the subjects of which are incorporated herein by reference.

Industrial Applicability

The multilayer porous film according to the embodiment can be used suitably for separation and decontamination of various substances at a high temperature because it has high heat resistance.

The multilayer porous film according to the present embodiment can be particularly suitably used for a separator for batteries because it has shutdown function. The multilayer porous film is particularly suitable for a battery separator for lithium ion secondary batteries.

The invention claimed is:

1. A separator for a nonaqueous electrolyte battery, comprising a multilayer porous film, comprising a porous layer including inorganic particles and a resin binder on at least one surface of a porous film including a polyolefin resin at a concentration from 50% by mass to 100% by mass,
    wherein the inorganic particle comprises calcined kaolin at a concentration from 50% by mass to 100% by mass, and the inorganic particles have a concentration in a range from 90% by mass to 99.9% by mass of the porous layer.

2. The separator for a nonaqueous electrolyte battery according to claim 1, wherein the inorganic particle further comprises agalmatolite clay.

3. The separator for a nonaqueous electrolyte battery according to claim 1, wherein an average particle size of the inorganic particles is more than 0.1 μm and not more than 4.0 μm.

4. The separator for a nonaqueous electrolyte battery according to claim 1, wherein in the inorganic particles, a proportion of particles having a particle size of more than 0.2 μm and not more than 1.4 μm based on the entire inorganic particles is not less than 2% by volume.

5. The separator for a nonaqueous electrolyte battery according to claim 4, wherein in the inorganic particles, a proportion of particles having a particle size of more than 0.2 μm and not more than 1.0 μm based on the entire inorganic particles is not less than 1% by volume.

6. The separator for a nonaqueous electrolyte battery according to claim 4, wherein in the inorganic particles, a proportion of particles having a particle size of more than 0.5 μm and not more than 2.0 μm based on the entire inorganic particles is not less than 8% by volume.

7. The separator for a nonaqueous electrolyte battery according to claim 4, wherein in the inorganic particles, a proportion of particles having a particle size of more than 0.6 μm and not more than 1.4 μm based on the entire inorganic particles is not less than 1% by volume.

8. The separator for a nonaqueous electrolyte battery according to claim 1, wherein a proportion (% by mass) of the inorganic particles in the porous layer is not less than 90% and not more than 99%.

9. The separator for a nonaqueous electrolyte battery according to claim 1, wherein the resin binder is polyvinyl alcohol.

10. The separator for a nonaqueous electrolyte battery according to claim 1, wherein the porous film is composed of a resin composition comprising polypropylene and a polyolefin other than polypropylene.

11. The separator for a nonaqueous electrolyte battery according to claim 10, wherein a proportion of polypropylene based on total polyolefins in the resin composition is 1 to 35% by mass.

12. A nonaqueous electrolyte battery, comprising the separator for the nonaqueous electrolyte battery according to claim 1, a positive electrode, a negative electrode, and an electrolyte solution.

13. The separator for a nonaqueous electrolyte battery according to claim 1, wherein the porous layer including inorganic particles and the resin binder has a thickness in a range from 3 μm to 10 μm.

14. The separator for a nonaqueous electrolyte battery according to claim 1, wherein the porous layer has a density in a range from 0.6 g/cm$^3$ to 1.2 g/cm$^3$.

15. The separator for a nonaqueous electrolyte battery according to claim 1, wherein the inorganic particle comprises calcined kaolin at a concentration from 80% by mass to 100% by mass.

16. The separator for a nonaqueous electrolyte battery according to claim 1, wherein the inorganic particle consists of calcined kaolin.

* * * * *